United States Patent [19]
Sugaya et al.

[11] Patent Number: 5,966,237
[45] Date of Patent: *Oct. 12, 1999

[54] CONTROLLER WHICH CONTROLS A VARIABLE OPTICAL ATTENUATOR TO CONTROL THE POWER LEVEL OF A WAVELENGTH-MULTIPLEXED OPTICAL SIGNAL WHEN THE NUMBER OF CHANNELS ARE VARIED

[75] Inventors: Yasushi Sugaya; Susumu Kinoshita, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/158,571

[22] Filed: Sep. 22, 1998

Related U.S. Application Data

[62] Division of application No. 08/845,847, Apr. 28, 1997.

[30] Foreign Application Priority Data

May 2, 1996 [JP] Japan .................................. 8-111447

[51] Int. Cl.⁶ .............................. H01S 3/16; H04B 10/12
[52] U.S. Cl. ........................ 359/341; 359/124; 359/179; 359/337
[58] Field of Search .................................. 359/124, 127, 359/179, 337, 341, 27

[56] References Cited

U.S. PATENT DOCUMENTS

| | | | |
|---|---|---|---|
| 4,644,145 | 2/1987 | Gundner | 359/134 |
| 5,396,360 | 3/1995 | Majima | 359/133 |
| 5,436,760 | 7/1995 | Nakabayashi | 359/341 |
| 5,463,487 | 10/1995 | Epworth | 359/124 |
| 5,510,926 | 4/1996 | Bayart et al. | 359/179 |
| 5,664,131 | 9/1997 | Sugiya | 359/341 |
| 5,764,404 | 6/1998 | Yamane et al. | 359/341 |

FOREIGN PATENT DOCUMENTS

| | | |
|---|---|---|
| 3-206427 | 9/1991 | Japan . |
| 5-241209 | 9/1993 | Japan . |
| 7212315 | 8/1995 | Japan . |
| 2280561 | 2/1995 | United Kingdom . |
| 2294170 | 4/1996 | United Kingdom . |

OTHER PUBLICATIONS

Japanese Publication "Er:Doped Fiber Amplifier for WDM Transmission Using Fiber Gain Control", Technical Report of IEICE, OCS94–66, OPE94, Nov. 1994. (including English language Abstract).

Nakabayashi, et al, Tech. Report of IEICE. OCS 94–66, OPE94–89 (Nov. 1994) pp. 31–36 and 1–15.

Sugaya et al, OAA '95 Paper FC3, Jun. 16, 1995, 5 pages.

*Primary Examiner*—Nelson Muskowitz
*Attorney, Agent, or Firm*—Staas & Halsey

[57] ABSTRACT

An optical amplifying apparatus which includes an optical amplifier, an optical attenuator and a controller. The optical amplifier amplifies a light signal having a variable number of channels. The optical attenuator passes the amplified light signal and has a variable light transmissivity. Prior to varying the number of channels in the light signal, the controller varies the light transmissivity of the optical attenuator so that a power level of the amplified light signal is maintained at an approximately constant level that depends on the number of channels in the light signal prior to the varying the number of channels. While the number of channels in the light signal is being varied, the controller maintains the light transmissivity of the optical attenuator to be constant. Subsequent to varying the number of channels in the light signal, the controller varies the light transmissivity of the optical attenuator so that a power level of the amplified light signal is maintained at an approximately constant level that depends on the number of channels in the light signal subsequent to the varying the number of channels.

30 Claims, 29 Drawing Sheets

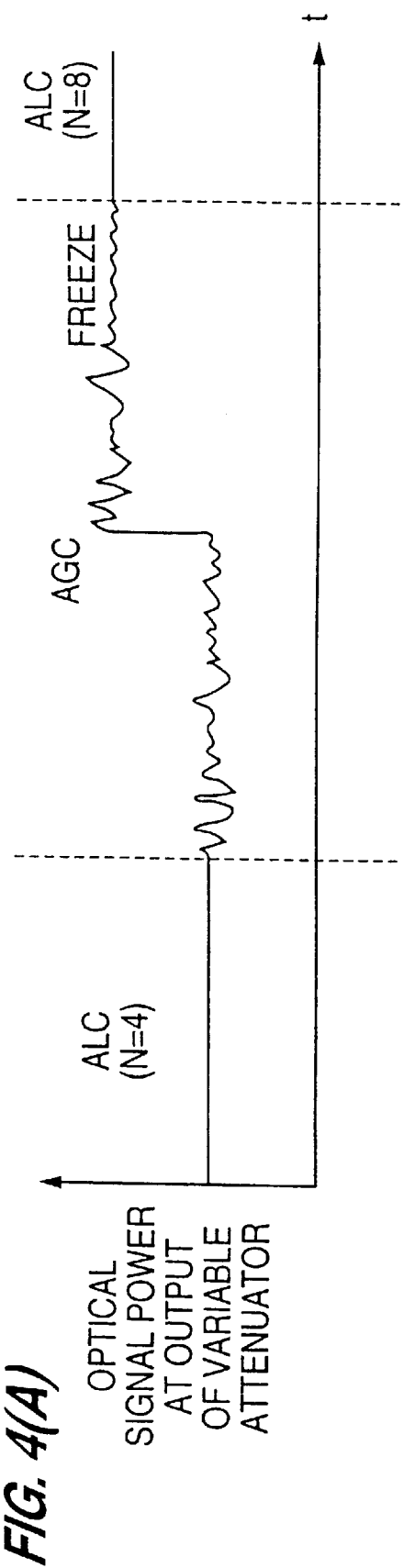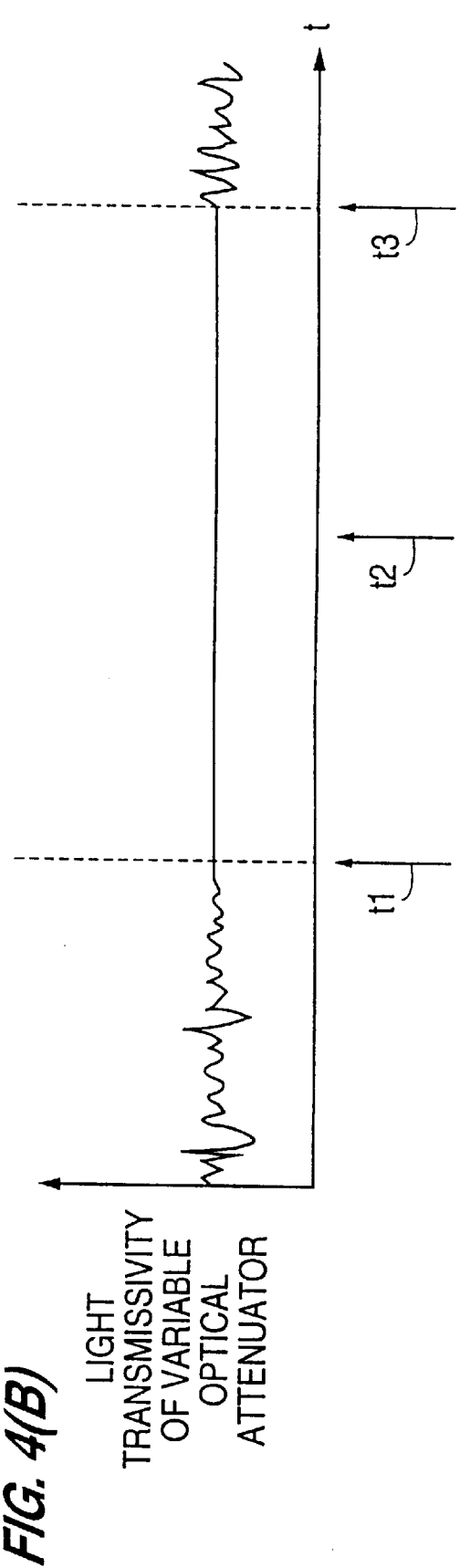
FIG. 4(A)
FIG. 4(B)

CONTROLLER WHICH CONTROLS A VARIABLE OPTICAL ATTENUATOR TO CONTROL THE POWER LEVEL OF A WAVELENGTH-MULTIPLEXED OPTICAL SIGNAL WHEN THE NUMBER OF CHANNELS ARE VARIED

CROSS-REFERENCE TO RELATED APPLICATIONS

This application is a division of Ser. No. 08/845,847 filed Apr. 28, 1997.

This application is based on, and claims priority to, Japanese patent application 08-111447, filed May 2, 1996, in Japan, and which is incorporated herein by reference.

This application is related to U.S. patent application Ser. No. 08/655,027, filed May 28, 1996, and which is incorporated herein by reference.

BACKGROUND OF THE INVENTION

1. Field of the Invention

The present invention relates to a fiber optic communication system which uses wavelength division multiplexing to transmit a wavelength-multiplexed optical signal. More specifically, the present invention relates to a controller which controls an optical attenuator or an optical amplifier to change the power level of the wavelength-multiplexed optical signal when the number of channels are varied.

2. Description of the Related Art

Wavelength division multiplexing is used in fiber optic communication systems to transfer a relatively large amount of data at a high speed.

FIG. 1 is a diagram illustrating a conventional fiber optic communication system which uses wavelength division multiplexing to transmit, for example, four channels through a single optical fiber. Referring now to FIG. 1, transmitting units 20-1, 20-2, 20-3 and 20-4 transmit individual carriers having wavelengths $\lambda 1$–$\lambda 4$, respectively. Each carrier is modulated with information and represents an individual channel. The different carriers are multiplexed together by an optical multiplexer 22 into a wavelength-multiplexed optical signal. The wavelength-multiplexed optical signal is transmitted through an optical fiber 24 to an optical demultiplexer 26. Optical demultiplexer 26 branches the wavelength-multiplexed optical signal into four separate optical signals having the wavelengths $\lambda 1$–$\lambda 4$, respectively. The four separate branched optical signals are then detected by receiving units 28-1, 28-2, 28-3 and 28-4, respectively.

While the above optical fiber communication system multiplexes four carriers together, it is common practice to multiplex more than four carriers. More specifically, many different carriers may be multiplexed together. In this manner, a relatively large amount of data can be transmitted through an optical fiber.

An optical amplifier (not illustrated) or an optical repeater (not illustrated) is typically inserted between optical multiplexer 22 and optical demultiplexer 26, to amplify the wavelength-multiplexed optical signal travelling through optical fiber 24. Such an optical amplifier is typically a rare-earth doped optical fiber amplifier which directly amplifies the wavelength-multiplexed optical signal. That is, a rare-earth doped optical fiber amplifier amplifies the wavelength-multiplexed optical signal without converting the wavelength-multiplexed optical signal into an electrical signal.

Unfortunately, the use of a rare-earth doped optical fiber amplifier causes several problems when the number of channels in the wavelength-multiplexed optical signal is varied. More specifically, during the variation (that is, before the variation in the number of channels is complete), the optical power of each channel can undesireably be varied, thereby causing non-linear degradation or S/N degradation of the wavelength-multiplexed optical signal.

SUMMARY OF THE INVENTION

Accordingly, it is an object of the present invention to provide an optical amplifying apparatus which reduces non-linear degradation and S/N degradation of a wavelength-multiplexed optical signal when the number of channels are varied.

Additional objects and advantages of the invention will be set forth in part in the description which follows, and, in part, will be obvious from the description, or may be learned by practice of the invention.

The foregoing objects of the present invention are achieved by providing an apparatus which includes an optical amplifier and a controller. The optical amplifier amplifies a light signal having a variable number of channels. The controller controls a power level of the amplified light signal in response to variations in the number of channels in the light signal.

More specifically, objects of the present invention are achieved by providing a controller which (a) prior to, and subsequent to, varying the number of channels in the light signal, passes the amplified light signal with a varying light transmissivity so that a power level of the amplified light signal is maintained at an approximately constant level in accordance with the number of channels in the light signal, and, (b) while the number of channels in the light signal is being varied, passes the amplified light signal with a constant light transmissivity.

Objects of the present invention are also achieved by providing an apparatus which includes an optical amplifier, a controller, a demultiplexer and an automatic level control unit. The optical amplifier amplifies a light signal having a variable number of channels. The controller controls the amplified light signal in response to variations in the number of channels in the light signal. The demultiplexer demultiplexes the controlled, amplified light signal into individual signals. The automatic level control unit controls the power level of a respective individual signal so that the power level of the individual signal is maintained to be approximately constant.

Objects of the present invention are also achieved by providing an apparatus which includes an automatic level control unit and an optical fiber amplifier. The automatic level control unit maintains a power level of a light signal to be approximately constant and produces a corresponding output signal. The optical fiber amplifier amplifies the output signal of the automatic level control unit with a constant gain.

Objects of the present invention are further achieved by providing an optical amplifier and a controller. The optical amplifier amplifies a light signal having a variable number of channels. Prior to, and subsequent to, varying the number of channels in the light signal, the controller maintains a power level of the amplified light signal at an approximately constant level in accordance with the number of channels in the light signal. While the number of channels in the light signal is being varied, the controller amplifies the amplified light signal with an approximately constant gain.

Moveover, objects of the present invention are achieved by providing an apparatus which includes an optical amplifier, an optical attenuator and a controller. The optical amplifier amplifies a light signal having a variable number of channels. The optical attenuator passes the amplified light signal and has a variable light transmissivity. Prior to varying the number of channels in the light signal, the controller varies the light transmissivity of the optical attenuator so that a power level of the amplified light signal is maintained at an approximately constant level that depends on the number of channels in the light signal prior to the varying the number of channels. While the number of channels in the light signal is being varied, the controller maintains the light transmissivity of the optical attenuator to be constant. Subsequent to varying the number of channels in the light signal, the controller varies the light transmissivity of the optical attenuator so that a power level of the amplified light signal is maintained at an approximately constant level that depends on the number of channels in the light signal subsequent to the varying the number of channels.

Objects of the present invention are also achieved by providing a method for controlling a light signal having a variable number of channels and amplified by an optical amplifier. The method includes the steps of: (a) prior to, and subsequent to, varying the number of channels in the light signal, passing the amplified light signal with a varying light transmissivity so that a power level of the amplified light signal is maintained at an approximately constant level in accordance with the number of channels in the light signal, and, (b) while the number of channels in the light signal is being varied, passing the amplified light signal with a constant light transmissivity.

Objects of the present invention are achieved by providing a method for controlling a light signal having a variable number of channels and amplified by an optical amplifier, wherein the method includes the steps of: (a) prior to, and subsequent to, varying the number of channels in the light signal, maintaining a power level of the amplified light signal at an approximately constant level in accordance with the number of channels in the light signal, and, (b) while the number of channels in the light signal is being varied, amplifying the amplified light signal with an approximately constant gain.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 4(A) and 4(B) are graphs illustrating the operation of the optical amplifying apparatus in FIG. 3, wherein the number of channels, N, in an optical signal is changed, according to an embodiment of the present invention.

EMBODIMENTS OF THE INVENTION

Figure 1:
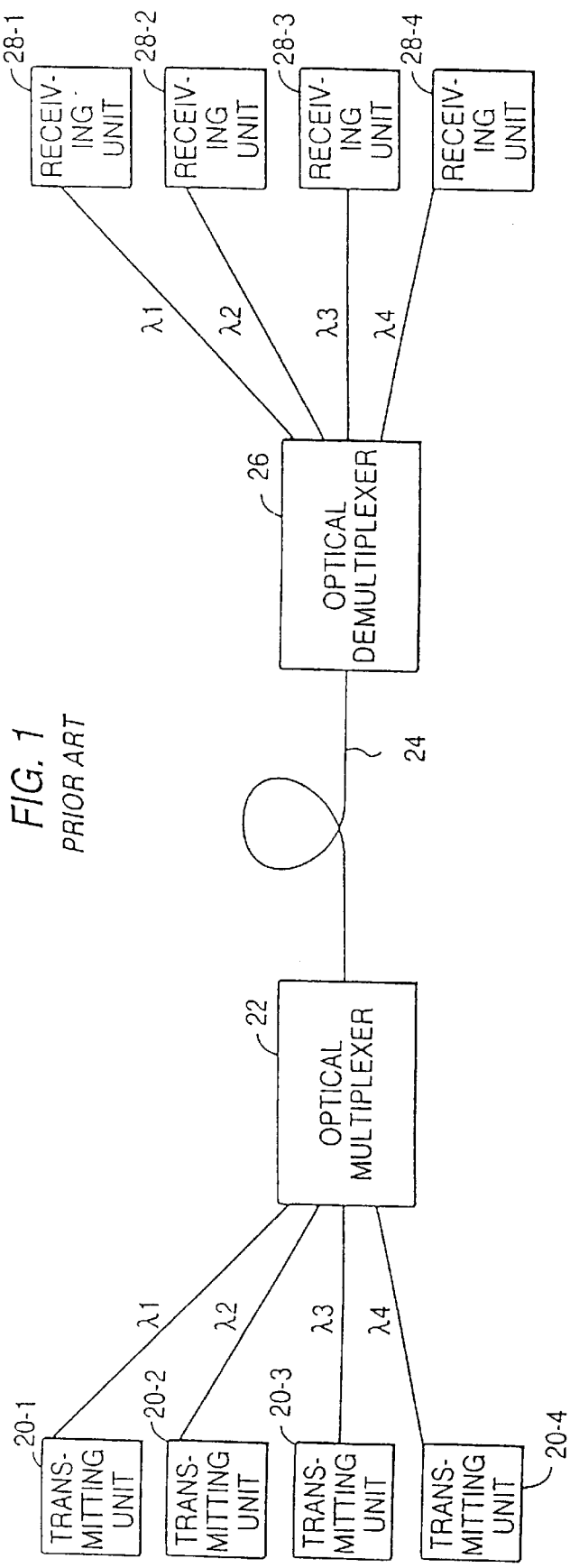
FIG. 1 (prior art) is a diagram illustrating a conventional fiber optic communication system.

Reference will now be made in detail to the present preferred embodiments of the present invention, examples of which are illustrated in the accompanying drawings, where like reference numerals refer to like elements throughout.

Figure 2:
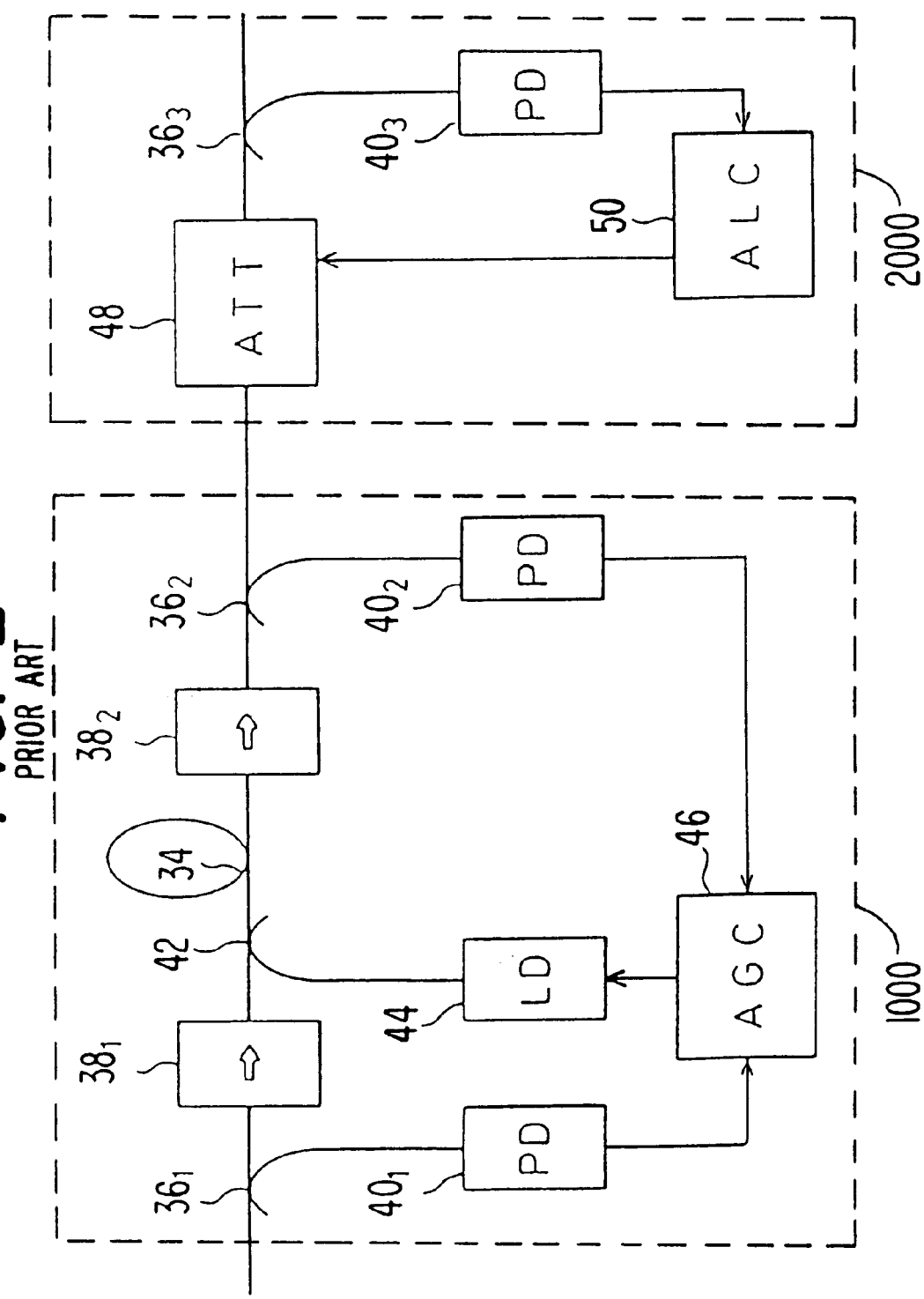
FIG. 2 (prior art) is a diagram illustrating an optical amplifying apparatus for a fiber optic communication system which uses wavelength division multiplexing.

FIG. 2 is a diagram illustrating an optical amplifying apparatus for a fiber optic communication system which uses wavelength division multiplexing, and is similar to that disclosed in related to U.S. patent application Ser. No. 08/655,027, which is incorporated herein by reference Referring now to FIG. 2, the optical amplifying apparatus includes a first part 1000 (sometimes referred to herein as a "rare-earth-doped optical fiber amplifier part") and a second part 2000 (sometimes referred to herein as an "electrically-controlled optical device part").

First part 1000 includes a rare-earth-doped optical fiber (EDF) 34, optical branching couplers $36_1$ and $36_2$, optical isolators $38_1$ and $38_2$, photodiodes $40_1$ and $40_2$, an optical wavelength multiplexing coupler 42, a pump laser diode (LD) 44 and an automatic optical gain control circuit (AGC) 46.

Second part 2000 includes optical branching coupler $36_3$, an electrically-controlled variable optical attenuator (ATT) 48, a photodiode (PD) $40_3$ and an automatic level control circuit (ALC) 50. Optical attenuator 48 is, for example, constructed of a magnetooptical element. However, many different types of variable optical attenuators can be used.

A wavelength-multiplexed optical signal is fed to rare-earth-doped optical fiber 34 via optical branching coupler $36_1$, optical isolator 38 and optical wavelength multiplexing coupler 42. A pump light beam is supplied by pump laser diode 44 to rare-earth-doped optical fiber 38 via optical wavelength multiplexing coupler 42. The wavelength-multiplexed optical signal is amplified by rare-earth-doped optical fiber 34 and input to optical attenuator 48 via optical isolator $38_2$ and optical branching coupler $36_2$.

A portion of the wavelength-multiplexed optical signal branched by optical branching coupler $36_1$ is converted into an electrical signal by photodiode $40_1$ and input to automatic optical gain control circuit 46. A portion of the amplified wavelength-multiplexed optical signal branched by optical branching coupler $36_2$ is converted into an electrical signal by photodiode $40_2$ and input to automatic optical gain control circuit 46. Pump laser diode 44 is controlled so as to maintain a ratio between a level of the input wavelength-multiplexed optical signal and a level of the amplified wavelength-multiplexed optical signal at a predetermined level.

More specifically, optical gain control circuit 46 controls pump laser diode 44 so as to maintain, at a constant level, the ratio between the level of the input wavelength-multiplexed optical signal as converted into an electrical signal by the photodiode $40_1$ and the level of the amplified wavelength-multiplexed optical signal as converted into an electrical signal by the photodiode $40_2$. In this manner, first part 1000 conserves the wavelength dependence by controlling the optical gain at a constant level.

A portion of an output wavelength-multiplexed optical signal branched by optical branching coupler $36_3$ is converted into an electrical signal by photodiode $40_3$ and input to automatic level control circuit 50. Optical attenuator 48 is controlled so as to maintain the wavelength-multiplexed optical signal at a predetermined level.

More specifically, automatic level control circuit 50 controls optical attenuator 48 using the electrical signal derived by photodiode $40_3$ from the wavelength-multiplexed optical signal, so as to maintain the output level of the wavelength-multiplexed optical signal at a constant level.

Unfortunately, when an optical amplifying apparatus, as illustrated in FIG. 2, is used in a fiber optic communication system which uses wavelength division multiplexing, a variation in the number of channels used in the wavelength-multiplexed optical signal can cause significant problems.

For example, a predetermined output optical power of an amplifier is generally required for each wavelength (channel) so as to ensure a desired S/N ratio in a receiver. Assuming there are a total of N channels, the total optical output Pc of a rare-earth-doped optical fiber amplifier for amplifying a wavelength-multiplexed optical signal is controlled to be N×P. In the presence of a variation of +α or −α in the number of channels N, switching control is effected so that the total optical power is (N±α)P. Because the optical power for individual wavelengths (channels) varies due to the switching control, non-linear degradation or signal-to-noise (S/N) degradation may result.

Further, in FIG. 2, the optical output of first part 1000 is to be maintained at a constant level by second part 2000. Therefore, when the optical output of first part 1000 exceeds a predetermined level, second part 2000 maintains the optical output at a constant level. As a result, the use of optical attenuator 48 will require an extra measure of amplification by first part 32, and the output power of pump laser diode 44 for maintaining the optical gain at a constant level should be controlled to be in an exponential relation to a variation in the level of the input wavelength-multiplexed optical signal. Therefore, it is necessary to provide a relatively high-capacity pump laser diode 44.

Figure 3:
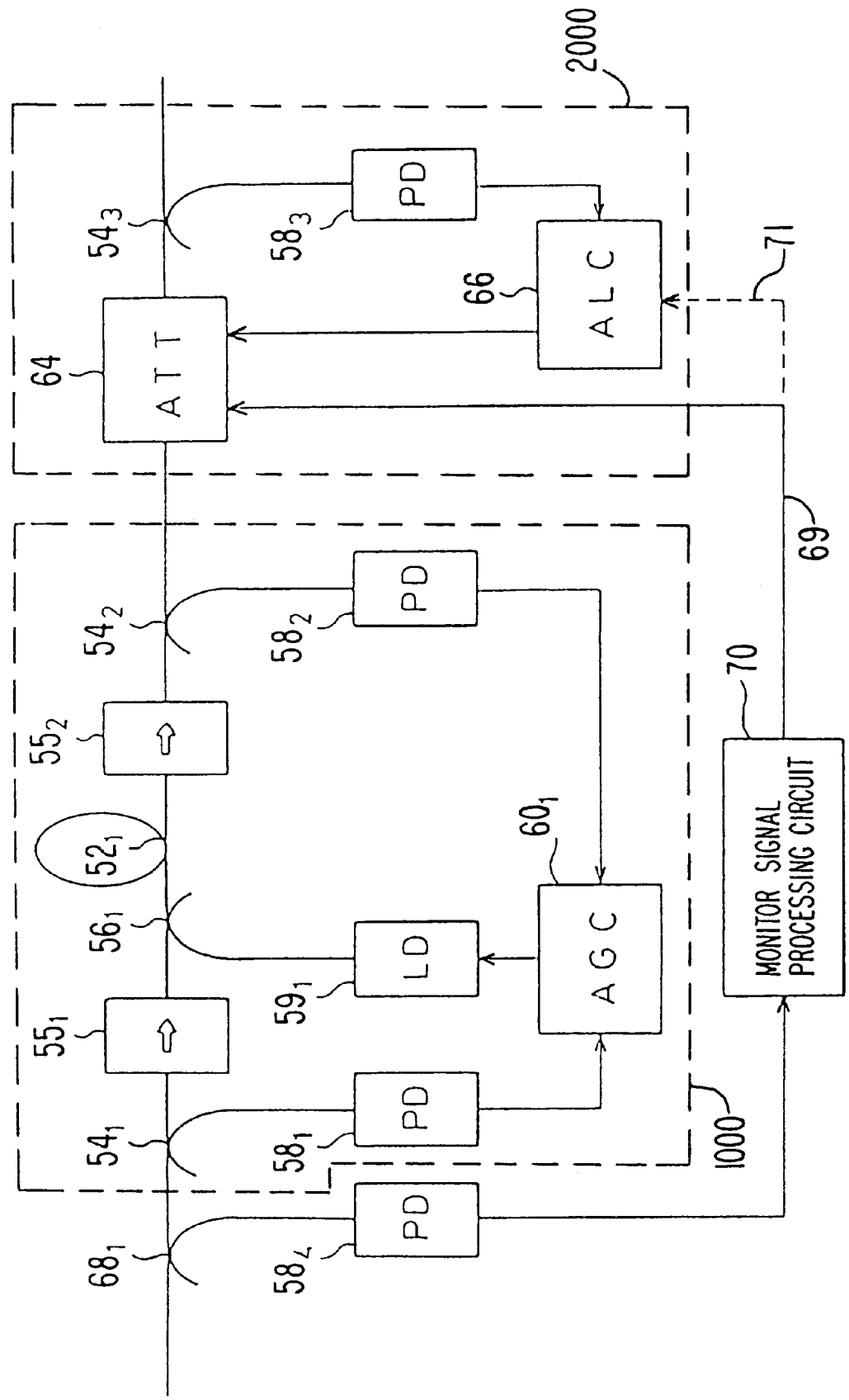
FIG. 3 is a diagram illustrating an optical amplifying apparatus, according to an embodiment of the present invention.

FIG. 3 is a diagram illustrating an optical amplifying apparatus, according to an embodiment of the present invention. The optical amplifying apparatus includes a first part 1000 and a second part 2000. First part 1000 includes a rare-earth-doped optical fiber (EDF) $52_1$, optical branching couplers $54_1$ and $54_2$, optical isolators $55_1$ and $55_2$, an optical wavelength multiplexing coupler $56_1$, photodiodes (PD) $58_1$ and $58_2$, a pump laser diode (LD) $59_1$, and an automatic gain control circuit (AGC) $60_1$. First part 1000 amplifies a wavelength-multiplexed optical signal while conserving wavelength dependence.

As an example, a wavelength-multiplexed optical signal is typically in the 1.5 μm band. An erbium-doped optical fiber is known to amplify optical signals in this band, and is therefore used as rare-earth-doped optical fiber (EDF) $52_1$. Moreover, to appropriately amplify a wavelength-multiplexed optical signal in the 1.5 μm band travelling through an erbium-doped optical fiber, it is known to use pump light of a 0.98 μm or 1.48 μm pump band. Therefore, pump laser diode (LD) $59_1$ provides pump light in the 0.98 μm or 1.48 μm pump band.

Moreover, FIG. 3 shows a forward pumping construction in which a pump light beam emitted by pump laser diode $59_1$ travels through rare-earth-doped optical fiber $52_1$ in the same direction as the wavelength-multiplexed optical signal. However, a backward pumping construction could also be used, where a laser diode provides a pump light beam which travels through rare-earth-doped optical fiber $52_1$ in the opposite direction as the wavelength-multiplexed optical signal. Further, a bi-directional pumping construction could be used, where two laser diodes provide pump light which travels through rare-earth-doped optical fiber $52_1$ in both directions through rare-earth-doped optical fiber $52_1$. Thus, the present invention is not intended to be limited to any specific type of directional pumping.

Second part 2000 includes an electrically-controlled variable optical attenuator (ATT) 64, an automatic level control circuit (ALC) 66, optical branching coupler $54_3$ and a photodiode (PD) $58_3$. Second part 2000 controls the total optical output of a wavelength-multiplexed optical signal to be at a constant level, without conserving wavelength dependence. More specifically, automatic level control circuit 66 varies the attenuation, or light transmissivity, of optical attenuator 64 so that the power of the wavelength-multiplexed optical signal, as output from first part 1000, is maintained at a constant power level corresponding to the number of channels in the wavelength-multiplexed optical signal.

Moreover, when the number of channels in the wavelength-multiplexed optical signal is being varied, a monitor signal processing circuit 70 causes the attenuation, or light transmissivity, of optical attenuator 64 to be maintained constant. Thus, monitor signal processing circuit 70 temporarily "freezes" the operation of optical attenuator 64. After the number of channels has been changed, monitor signal processing circuit 70 allows the attenuation, or light transmissivity, of optical attenuator 64 to be varied so that the power of the wavelength-multiplexed optical signal is maintained at a constant level in accordance with the new number of channels.

More specifically, the wavelength-multiplexed optical signal input to the optical amplifying apparatus is branched by an optical branching coupler $68_1$. The branched portion is provided to a photodiode (PD) $58_4$. Photodiode (PD) $58_4$ converts the branched portion into an electrical signal and provides the electrical signal to monitor signal processing circuit 70.

A control signal, which warns of a variation in the number of channels in the wavelength-multiplexed optical transmission system, is superimposed on the wavelength-multiplexed optical signal preferably as a low-speed signal through an amplitude modulation process. However, other methods can be used to superimpose the control signal. Monitor signal processing circuit 70 extracts and identifies the control signal. Monitor signal processing circuit 70 then controls optical attenuator 64 or automatic level control circuit 66 in accordance with the extracted control signal. If amplitude modulation is used, it is relatively easy to extract the control signal by demodulating the electrical signal obtained by photodiode $58_4$.

Alternatively, the control signal may be transmitted to monitor signal processing circuit 70 on a dedicated control channel (wavelength). If a dedicated control channel is used, an optical branching filter (not illustrated) should extract the control signal out of the wavelength-multiplexed optical signal (as branched by optical branching coupler $68_1$). For example, by feeding the optical signal extracted by the optical branching filter to photodiode $58_4$ so as to be converted into an electrical signal, it is possible to extract the control signal.

Therefore, a portion of the wavelength-multiplexed optical signal branched by optical branching coupler $68_1$ is converted into an electrical signal by photodiode $58_4$ and fed to monitor signal processing circuit 70. Monitor signal processing circuit 70 "freezes" an operation of optical attenuator 64, when a control signal warning of a variation in the number of channels is extracted and identified.

In order to ensure that the power level of the attenuated wavelength-multiplexed optical signal matches the number of channels, monitor signal processing circuit 70 causes a set voltage (reference voltage) to be selected. The power level can then be controlled to be at a constant level corresponding to the set voltage.

Generally, there are two approaches for monitor signal processing circuit 70 to control optical attenuator 64. In one approach, optical attenuator 64 is directly controlled by monitor signal processing circuit 70, as illustrated by control signal 69 in FIG. 3. In an alternative approach, optical attenuator 64 is indirectly controlled by monitor signal processing circuit 70, as illustrated by control line 71 in FIG. 3.

The number of channels may actually be increased or decreased after a warning for a change in the number of channels. In this instance, a control signal, which indicates the completion of the change in the number of channels, is superimposed on the wavelength-multiplexed optical signal. Monitor signal processing circuit 70 then extracts the control signal. Alternatively, the control signal may be transmitted to monitor signal processing circuit 70 on a dedicated control channel (wavelength). Upon extracting and identifying the control signal, monitor signal processing circuit 70 allows optical attenuator 64 to resume its control for maintaining the power level of the wavelength-multiplexed optical signal at a constant level.

Alternatively, instead of providing monitor signal processing circuit 70 with a control signal indicating the completion of the change in the number of channels, such completion can be assumed after a predetermined period of time elapses. More specifically, the number of channels may actually be increased or decreased after lapse of a predetermined period of time since the warning for a change in the number of channels is given. In this instance, after the control signal for giving warning of a variation in the number of channels is extracted and identified by monitor signal processing signal 70, a timer (not illustrated) is activated. When a predetermined period of time has passed, optical attenuator 64 is driven again to maintain the power level of the wavelength-multiplexed optical signal at a constant level.

Whether a control signal or a predetermined period of time is used to indicate the completion of a variation in the number of channels, the set voltage (reference voltage) for controlling the power level is switched from one level to another in accordance with information relating to how many channels are added or removed. This information is preferably included in the control signal for warning of a variation in the number of channels. Therefore, by resuming the control for maintaining the total optical output power at a constant level, the optical output is maintained at a constant level that matches the number of channels.

Therefore, in response to a change in the number of channels, optical attenuator 64 prevents a radical variation in the optical output power, by having its attenuation frozen at a constant level. At this time, second part 2000 no longer operates to maintain the power of the wavelength-multiplexed optical signal at a constant level. After the number of channels is changed, optical attenuator 64 is again controlled to maintain the power of the wavelength-multiplexed optical signal at a constant level. Optical attenuator 64 may gradually be driven so that a total output power corresponding to the number of channels is maintained. With this arrangement, it is possible to moderate a variation in the optical output and avoid non-linear degradation and S/N ratio degradation.

FIGS. 4(A) and 4(B) are graphs illustrating the operation of the optical amplifying apparatus in FIG. 3, wherein the number of channels, N, in an optical signal is changed from, for example, four channels to eight channels. Referring now to FIGS. 4(A) and 4(B), optical attenuator 64 has a variable light transmissivity, or attenuation, which is controlled by automatic level control circuit 66 an monitor signal processing circuit 70.

In FIGS. 4(A) and 4(B), a warning of a change in the number of channels is received at time t1, and the number of channels are increased at time t2.

Before a warning of a change in the number of channels is received (that is, before time t1), automatic level control circuit 66 varies the light transmissivity of electrically-controlled variable optical attenuator 64 to provide a substantially constant optical signal power at the output of optical attenuator 64. Therefore, before time t1, second part 2000 performs automatic level control (ALC).

When a warning of a change in the number of channels is received (that is, at time t1), automatic level control circuit 66 maintains the light transmissivity of electrically-controlled variable optical attenuator 64 to be substantially constant. In this case, the output of optical attenuator 64 can be seen has having a constant gain which is provided, for example, by first part 1000 or by a later stage (not illustrated) which further amplifies the signal. Therefore, after time t1, automatic gain control (AGC), not automatic level control (ALC), is performed.

At time t3, subsequent to a change in the number of channels, automatic level control circuit 66 varies the light transmissivity of electrically-controlled variable optical attenuator 64 to provide a substantially constant optical signal power at the output of optical attenuator 64. More specifically, after time t3, second part 2000 again performs automatic level control (ALC).

As can be seen from FIGS. 4(A) and 4(B), optical attenuator 64 is controlled to provide ALC. However, when the number of channels is being changed, ALC is halted. Instead, when the number of channels is being changed, optical attenuator 64 is controlled to provide a constant light transmissivity, or attenuation. The operation of optical attenuator 64 can be described as being "frozen" when the number of channels is being changed between times t1 and t3 in FIGS. 4(A) and 4(B).

As described above, between times t1 and t3, the output of optical attenuator 64 has a constant gain which is provided, for example, by first part 1000 or by a later stage (not illustrated) which further amplifies the signal. Alternatively, as disclosed in additional embodiments of the present invention described in more detail below, second part 2000 can be modified so that it provides a constant gain (instead of providing automatic level control) while the number of channels is being changed. In this case, second part 2000 could include a gain controlled amplifier to provide a constant gain for AGC between times t1 and t3.

Therefore, as illustrated in FIGS. 4(A) and 4(B), an optical amplifying apparatus includes an optical amplifier (such as first part 1000) which amplifies a light signal having a variable number of channels. Prior to, and subsequent to, varying the number of channels in the light signal, a controller (such as second part 2000) passes the amplified light signal with a varying light transmissivity so that a power level of the amplified light signal is maintained at an approximately constant level in accordance with the number of channels in the light signal. Further, while the number of channels in the light signal is being varied, the controller passes the amplified light signal with a constant light transmissivity.

Figure 5:
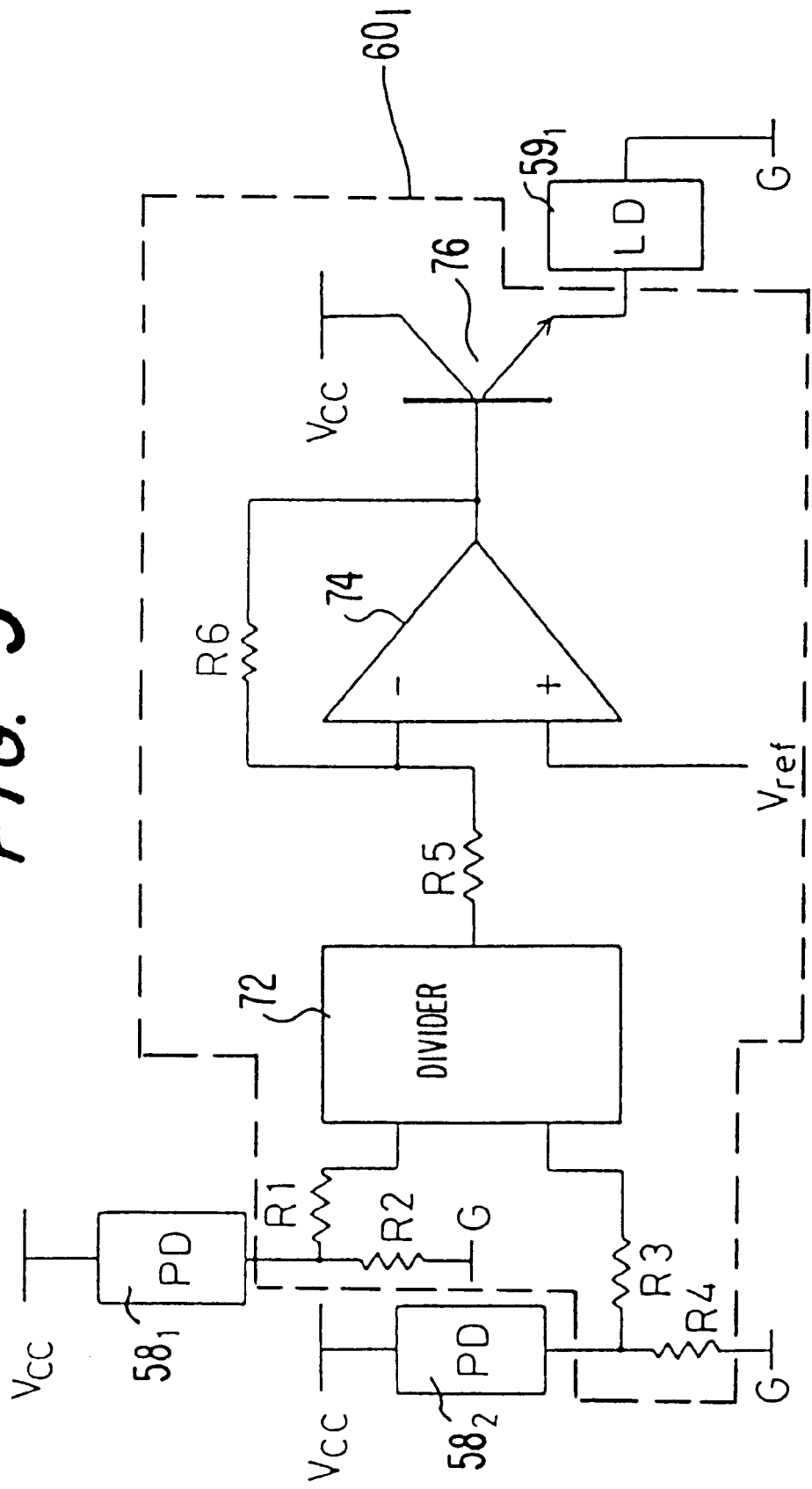
FIG. 5 is a diagram illustrating an automatic gain control circuit, according to an embodiment of the present invention.

FIG. 5 is a diagram illustrating automatic gain control circuit $60_1$, for controlling an optical gain to be at a constant level. Referring now to FIG. 5, automatic gain control circuit $60_1$ includes a divider 72, an operational amplifier 74, a transistor 76 and resistors R1–R6. $V_{cc}$ is a power supply voltage, $V_{ref}$ is a reference voltage, and G is the earth or ground.

As illustrated in FIG. 5, photodiode (PD) $58_1$ converts a portion of the wavelength-multiplexed optical signal into an electrical signal which is provided to divider 72. Photodiode (PD) $58_2$ converts a portion of the amplified wavelength-multiplexed optical signal into an electrical signal which is provided to divider 72. In this manner, divider 72 obtains a ratio between the input and the output of rare-earth-doped optical fiber (EDF) $52_1$. The pump light beam emitted by pump laser diode $59_1$ can then be controlled to produce a constant ratio, thereby providing a constant gain. The configuration of automatic gain control circuit $60_1$ in FIG. 5 is just one example of many possible configurations for an automatic gain control circuit.

Figure 6:
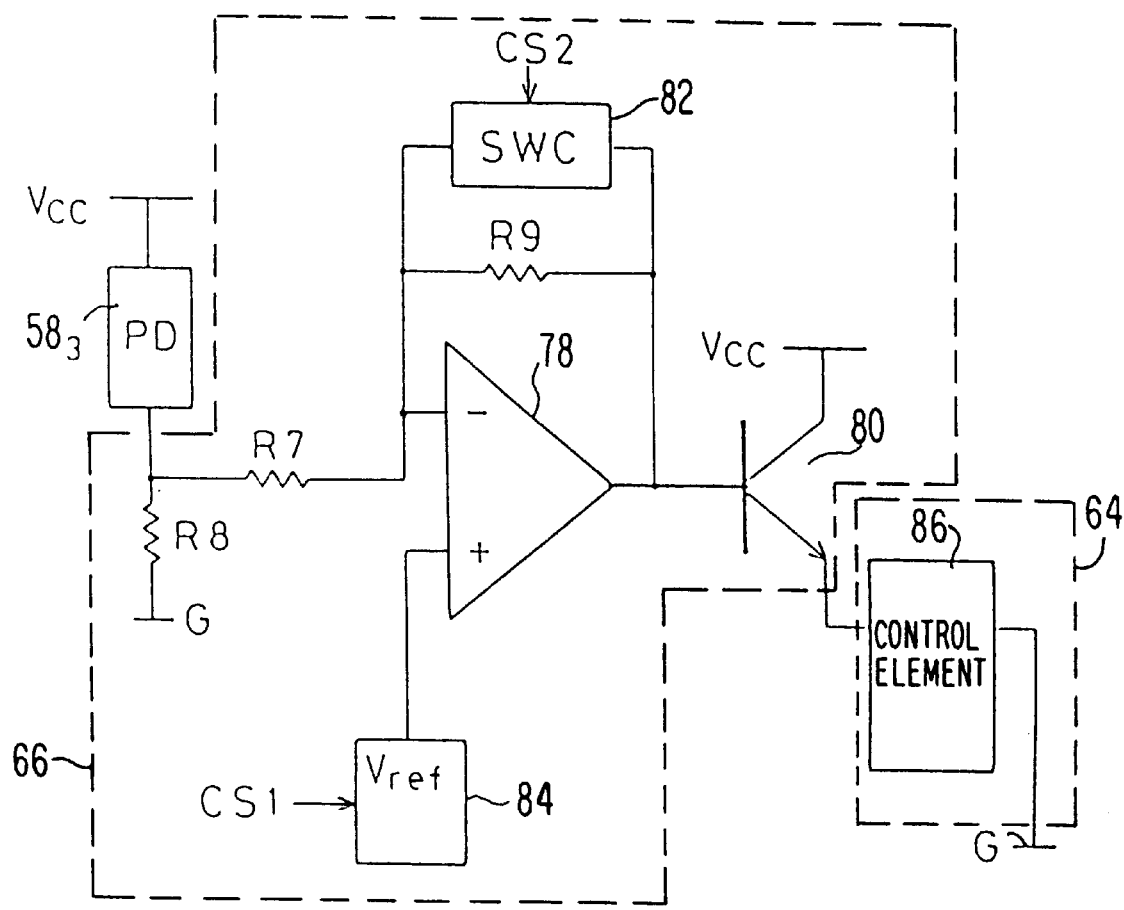
FIG. 6 is a diagram illustrating automatic level control circuit, according to an embodiment of the present invention.

FIG. 6 is a diagram illustrating automatic level control circuit 66, for controlling an optical output at a constant level. Referring now to FIG. 6, automatic level control circuit 66 includes resistors R7–R9, an operational amplifier 78, a transistor 80, a switching circuit (SWC) 82 and a reference voltage circuit 84. $V_{cc}$ is the power supply voltage, $V_{ref}$ is a reference voltage, G is the earth or ground, and cs1 and cs2 are control signals provided by monitor signal processing circuit 70. A control element 86 is a control element of optical attenuator 64 for controlling the transmissivity of optical attenuator 64.

For example, if optical attenuator 64 is operated by a magnetooptical effect, control element 86 may be a coil for applying a magnetic field. Moreover, for example, if optical attenuator is operated by an opto-electrical effect, the control element 86 may be an electrode, where the voltage applied to the electrode is controlled. If a semiconductor optical amplifier is used instead of optical attenuator 64, a bias voltage for controlling the gain of the semiconductor optical amplifier can be controlled.

A portion of the optical signal output from optical attenuator 64 (see FIG. 3) is branched by optical branching coupler $54_3$ and converted into an electrical signal by photodiode (PD) $58_3$. Then, in FIG. 6, operational amplifier 78 compares the electrical signal with the reference voltage (set voltage) $V_{ref}$ supplied by reference voltage circuit 84 in accordance with control signal CS1. A difference obtained as a result of the comparison is used to drive transistor 80. By controlling a current supplied to control element 86, the attenuation provided by optical attenuator 64 is controlled so that the optical output is maintained at a constant level.

Figure 7:
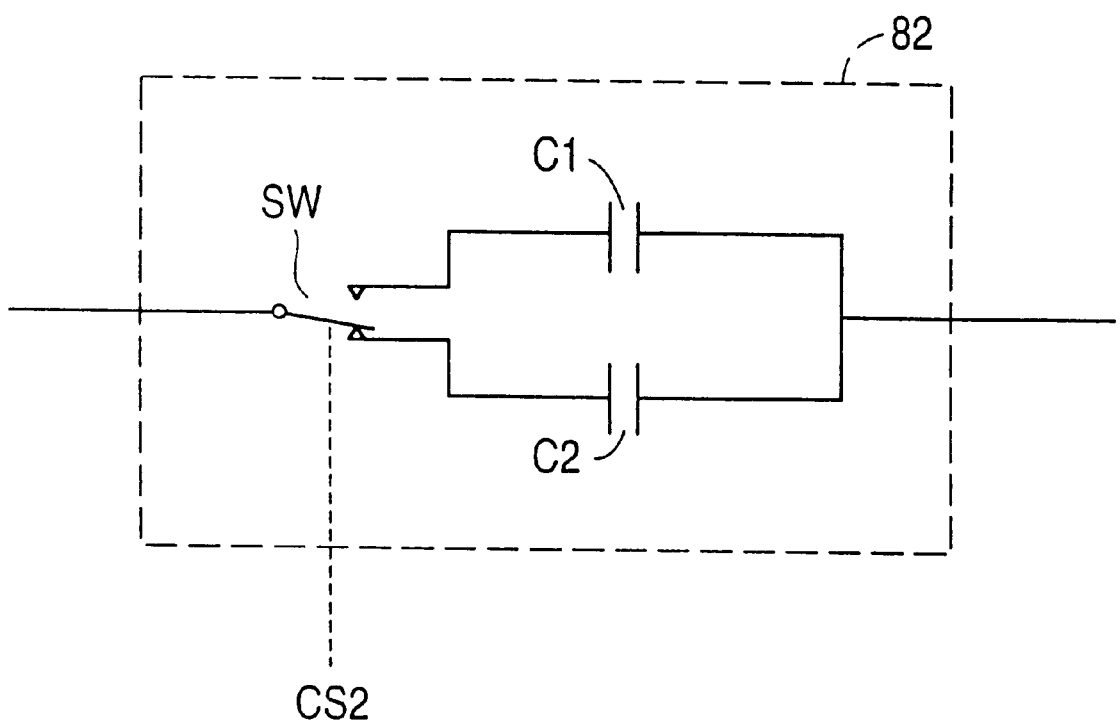
FIG. 7 is a diagram illustrating a switching circuit of the automatic level control circuit in FIG. 6, according to an embodiment of the present invention.

FIG. 7 is a diagram illustrating switching circuit 82. Referring now to FIG. 7, switching circuit 82 includes capacitors C1 and C2 which are individually selected with a switch SW that is controlled by the control signal CS2. Therefore, switching circuit 82 controls the frequency characteristic of automatic level control circuit 66. Moreover, switching circuit 82 controls optical attenuator 64 by controlling transistor 80 by following the level of the output wavelength-multiplexed optical signal with a predetermined frequency characteristic. The control signal cs2 from monitor signal processing circuit 70 changes the frequency characteristic by switching between capacitors C1 and C2 of switching circuit 82. The control signal cs1 switches between different levels of the reference voltages in accordance with the number of channels.

More specifically, switching circuit 82, coupled with operational amplifier 78 (see FIG. 6) and resistors R7 (see FIG. 6) and R9 (see FIG. 6), forms a primary low-pass filter. The cut-off frequency, $f_c$, of this primary low-pass filter is:

$$f_c = 1/(2\pi R9 \cdot C_{SWC} 9),$$

where $C_{SWC}$ is the selected capacitor $C_1$ or $C_2$. Therefore, by increasing the value of the capacitance $C_{SWC}$, the control circuitry shown in FIG. 6 is operated at a lower frequency. That is, the response thereof is slowed down.

Therefore, depending on the capacitance of the selected capacitor C1 or C2 of switching circuit 82, the filter cut-off frequency in the high-frequency zone can be changed.

As an example, a preferably arrangement may be that the cut-off frequency, which is on the order of 10–100 kHz in the normal ALC operation, be switched to 0.01 Hz when optical attenuator 64 is controlled to provide a constant attenuation (for example, to thereby provide a constant gain when the channels are being switched). Ideally, the control of switching circuit 82 occurs gradually, but a gradual control requires that switching circuit 82 be constructed of a number of capacitors, instead of simply two capacitors.

Referring to FIG. 6, the cut-off frequency is high before a warning of a change in channels is received. When a signal warning of a change in the number of channels is received, switching circuit 82 is controlled so that the cut-off frequency is lowered. Accordingly, the attenuation provided by optical attenuator 64 is fixed at an average level. After the change in channels is completed, switching circuit 82 is controlled so that the cut-off frequency is switched again to be high.

For example, when monitor signal processing circuit 70 extracts and identifies a control signal which warns of a variation in the number of channels, control signal cs2 is supplied to switching circuit 82 so that the frequency characteristic of automatic level control circuit 66 is switched to a low frequency zone. As a result, the following performance for following a variation in the signal detected by photodiode (PD) $58_3$ is lowered. That is, the constant-level control of the optical output is temporarily frozen (for example, the light transmissivity of optical attenuator 64 is maintained to be constant). Further, control signal cs1 corresponds to the number of channels to be included in the optical signal, and monitor signal processing circuit 70 supplies the control signal cs1 to reference voltage circuit 84. Reference voltage circuit 84 then supplies a reference voltage $V_{ref}$ corresponding to the number of channels. Therefore, the total optical output power assumes a level matching the number of channels after the variation in the number of channels. For example, the reference voltage $V_{ref}$ is changed such that, when a total of α channels are added to the total of N original channels, the total optical output becomes $(N+\alpha) \times P$.

Referring again to FIGS. 6 and 7, the value of the capacitance $C_{SWC}$ may be large enough to freeze the operation of optical attenuator 64. Generally, this purpose may be achieved if, for example, the cut-off frequency $f_c$ is dropped from 10 kHz to 0.01 Hz, thereby requiring a drop in the cut-off frequency $f_c$ by the factor of 10,000 to 100,000. Such a large drop can be difficult to achieve.

Normally, the attenuation provided by optical attenuator 64 is varying from moment to moment to provide an ALC function and to compensate for a polarization variation. Therefore, abruptly fixing the attenuation of optical attenuator 64 at a certain level (such as when the number of channels are being changed) may cause problems. Instead, the attenuation is preferably maintained at an average level.

Figure 8:
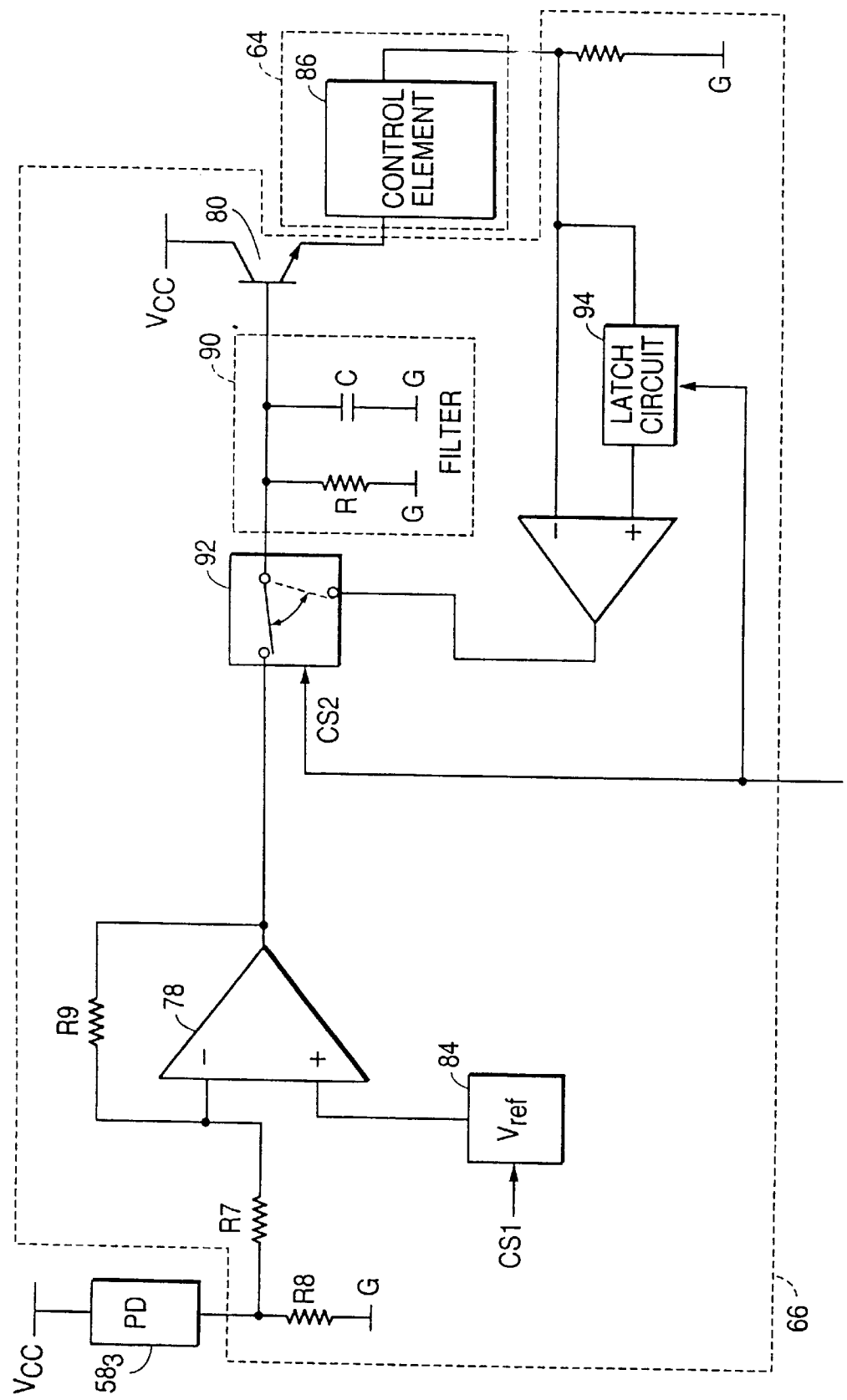
FIGS. 8 and 9 are diagrams illustrating an automatic level control circuit, according to additional embodiments of the present invention.
Figure 9:
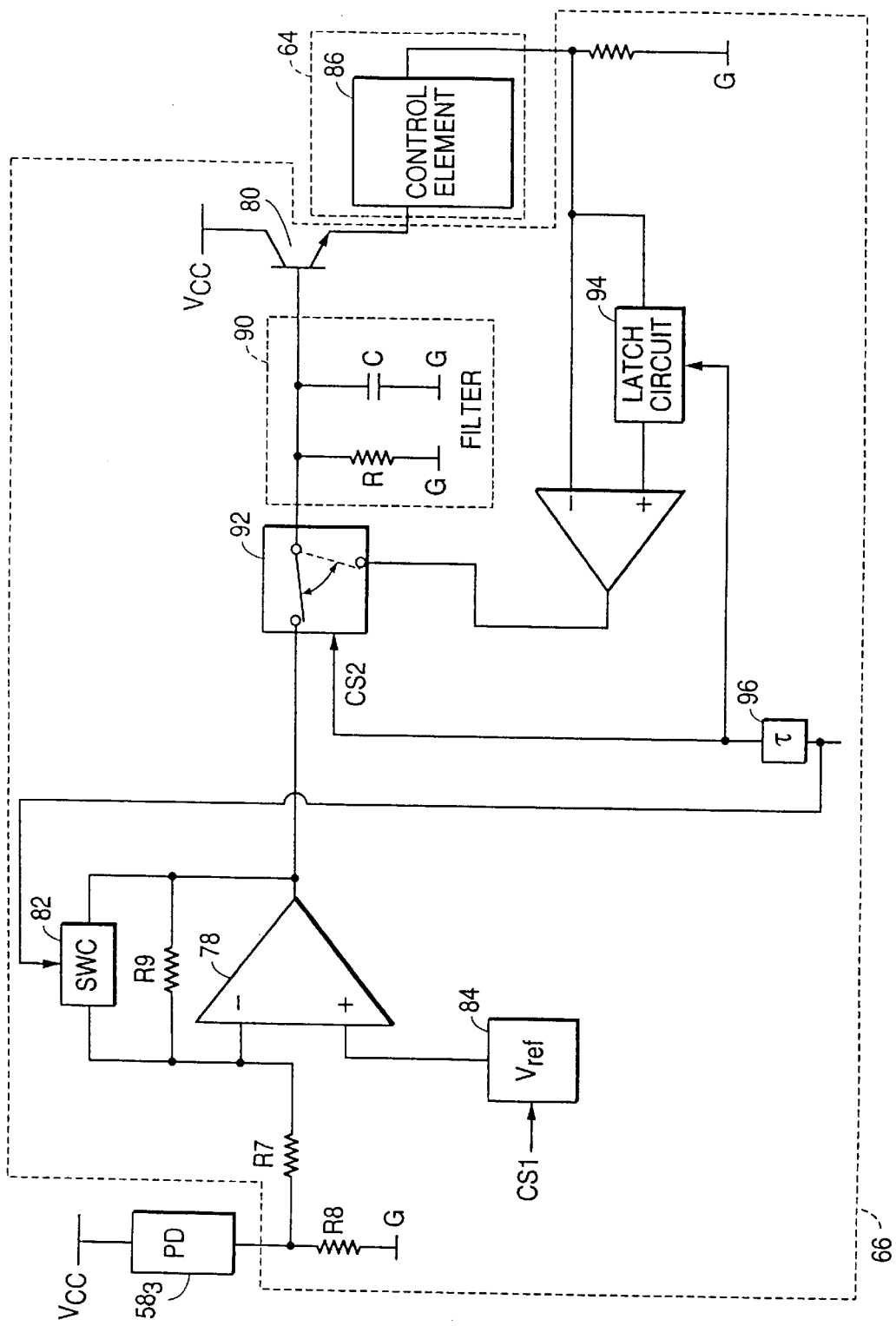

More specifically, FIGS. 8 and 9 are diagrams illustrating automatic level control circuit 66, according to additional embodiments of the present invention. Referring now to FIG. 8, a filter 90 for cutting off high frequencies ($f_c$:~10 KHz) and constructed of a capacitor and a resistor is provided between a switch 92 and transistor 80 so that the response of the automatic level control becomes adequate. For example, the time constant, typically on the order of sub-milliseconds, may be changed to the time constant on the order of 10–100 milliseconds.

When the cut-off frequency $f_c$ is switched to the high-frequency zone, the filter response becomes quick so that a comparatively high-speed variation, such as a polarization variation, can be cancelled and the output of optical attenuator 64 is maintained constant.

More specifically, in FIG. 8, a latch circuit 94 which has a low-pass filter ($f_c$:~0.01 Hz) stores a voltage corresponding to an average level of the current in control element 86. During an ALC operation, switching of the control loop occurs so that the control loop for controlling the drive current at a constant level is initiated. That is, when the switching of the control loop occurs, the voltage corresponding to the average level of the current is latched in latch circuit 94 so as to serve as a reference voltage. The term "average level" is used because the bias current has a time-dependent variation in order to maintain the level of the beam input to photodiode (PD) $58_3$ at a constant level. More specifically, the voltage obtained by integration using a more extended integral time than that provided by the time constant of the normal control loop is latched in latch circuit 94.

Latch circuit 94 may be a circuit for reading the value of the driving current (provided by transistor 80) via an A/D converter, registering the read value and outputting the registered value via a D/A converter.

FIG. 9 is a combination of FIGS. 6 and 8. Referring now to FIG. 9, the capacitance $C_{SWC}$ is switched by switching circuit 82 to cause the cut-off frequency $f_c$ to be shifted to a low-frequency zone, to thereby slow the filter response. Thereupon, latch circuit 94 controls the attenuation to the average based on a monitored value.

More specifically, in FIG. 9, switching of the control loop is made to occur after increasing the time constant of the normal control loop according to the control illustrated in FIG. 6, so as to reduce an effect caused in the ALC characteristic as a result of the switching of the control loop.

As has been described above, monitor signal processing circuit 70 may receive a control signal for reporting completion of a variation in the number of channels after it receives a control signal for giving warning of a variation in the number of channels. Alternatively, however, monitor signal processing circuit 70 may not receive a control signal when the variation in the number of channels is complete. In this case, a timer (not illustrated) would be activated after the control signal for giving warning of a variation in the number of channels is extracted and identified.

The control signal cs2 returns switching circuit 82 to the original frequency characteristic after the control signal for reporting a completion of a variation in the number of channels is received, or after a predetermined period of time has passed. Thereupon, the constant optical output control is resumed in accordance with the new reference voltage $V_{ref}$ set by reference voltage circuit 84.

The control for maintaining the total optical output at a constant level that corresponds to the number of channels may be resumed in a gradual manner. For example, the output signal of photodiode (PD) 58$_3$ may be input to operational amplifier 78 via a time constant circuit 96, or reference voltage $V_{ref}$ may be gradually varied to assume a level that corresponds to the number of channels.

While the above-described arrangement ensures that the frequency characteristic is switched as a result of the control effected by switching circuit 82 so that the constant-level control of the optical output is frozen, it is also possible to hold the signal output by photodiode (PD) 58$_3$ when the control signal for giving warning of a variation in the number of channels is extracted and identified. In this instance, the held value is input to operational amplifier 78 so that the constant-level control of the optical output is frozen. Other arrangements for freezing the constant-level control of the optical output are also possible. While it is assumed that the electrically-controlled optical device part is constructed using optical attenuator 64, a semiconductor optical amplifier can be used instead of optical attenuator 64. The semiconductor optical amplifier should have a small wavelength dependence. By controlling the semiconductor optical amplifier, the total optical output may be controlled at a constant level.

Figure 10:
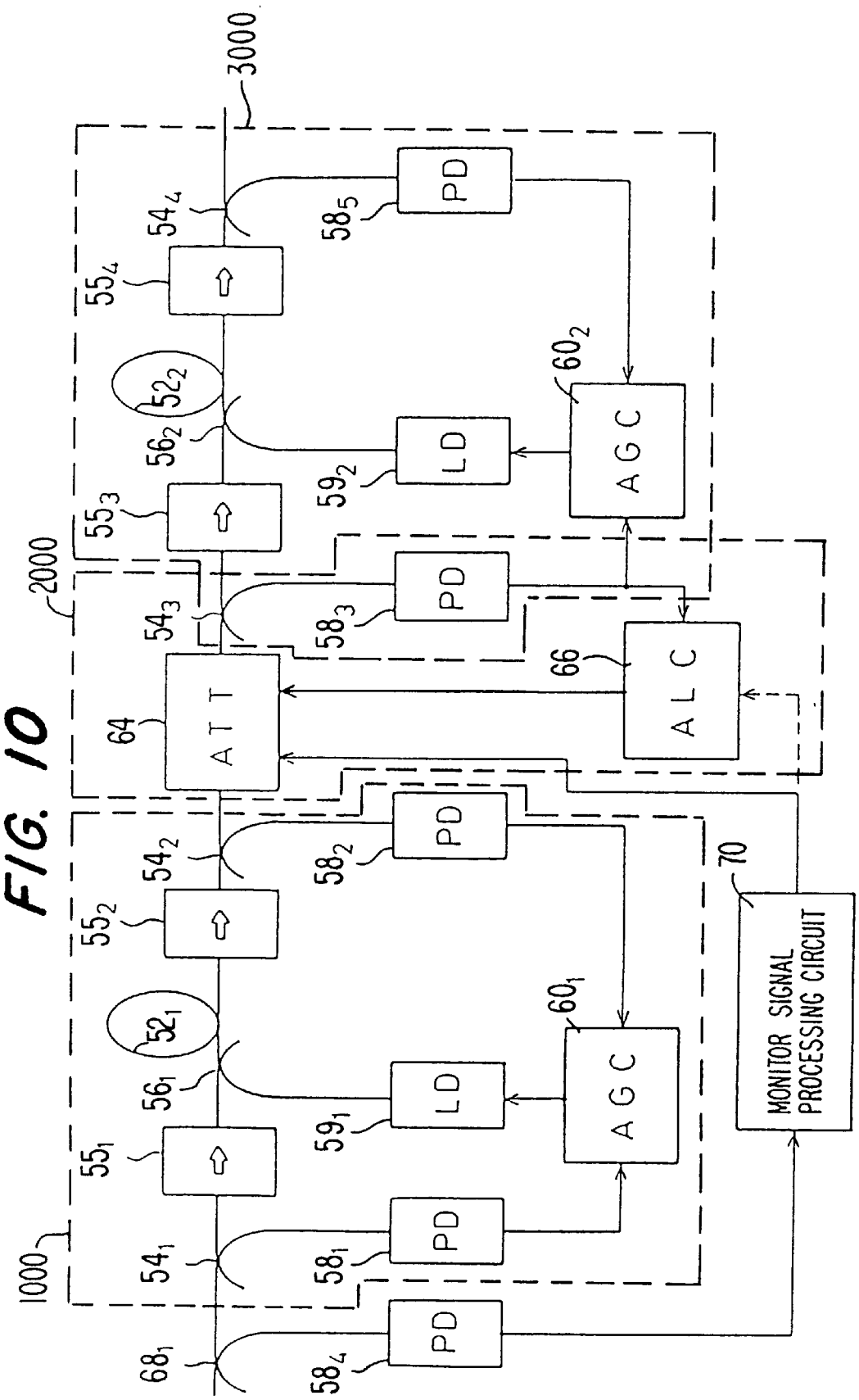
FIG. 10 is a diagram illustrating an optical amplifying apparatus, according to an additional embodiment of the present invention.

FIG. 10 is a diagram illustrating an optical amplifying apparatus, according to an additional embodiment of the present invention. Referring now to FIG. 10, the optical amplifying apparatus includes first part 1000, second part 2000 and a third part 3000. Third part 3000 includes a rare-earth-doped optical fiber (EDF) 52$_2$, an optical branching coupler 54$_4$, an optical wavelength multiplexing coupler 56$_2$, optical isolators 55$_3$ and 55$_4$, a photodiode (PD) 58$_5$, a pump laser diode (LD) 59$_2$ and an automatic gain control circuit (AGC) 60$_2$. Third part 3000 also shares optical branching coupler 54$_3$ and the photodiode (PD) 58$_3$ with second part 2000.

As with first part 1000, third part 3000 controls an optical gain to be at a constant level. More specifically, second part 2000 controls the power level of the wavelength-multiplexed optical signal received by third part 3000 to be at a constant power level. As a result, the optical output power level of third part 3000 is also maintained at a constant power level. Even when the optical signal level is attenuated by optical attenuator 64 of second part 2000, amplification provided by third part 3000 ensures that a desired total optical output is obtained.

Therefore, pump laser diode 59$_1$ of first part 1000 and pump laser diode 59$_2$ of third part 3000 can each have a relatively small capacity, thereby reducing the cost and stabilization of the amplifying apparatus.

Although FIG. 10 shows second part 2000 and third part 3000 sharing optical branching coupler 54$_3$ and photodiode (PD) 58$_3$, it is also possible to provide a separate optical branching coupler and a separate photodiode in each of the second part 2000 and the third part 3000.

Automatic gain control circuits 60$_1$ and 60$_2$ may have the same configuration. Moreover, the optical gains provided by first part 1000 and third part 3000 may be identical. Alternatively, the gains may be varied according to the characteristics of a transmission optical fiber used in third part 3000.

In the event of a variation in the number of channels, the optical attenuation provided by optical attenuator 64 is frozen directly by monitor signal processing circuit 70, or by monitor signal processing circuit 70 controlling automatic level control circuit 66. Similar to the embodiment shown in FIG. 3, it is ensured that a variation in the optical output in response to a variation in the number of channels is restricted so that non-linear degradation and S/N ratio degradation are reduced.

Figure 11:
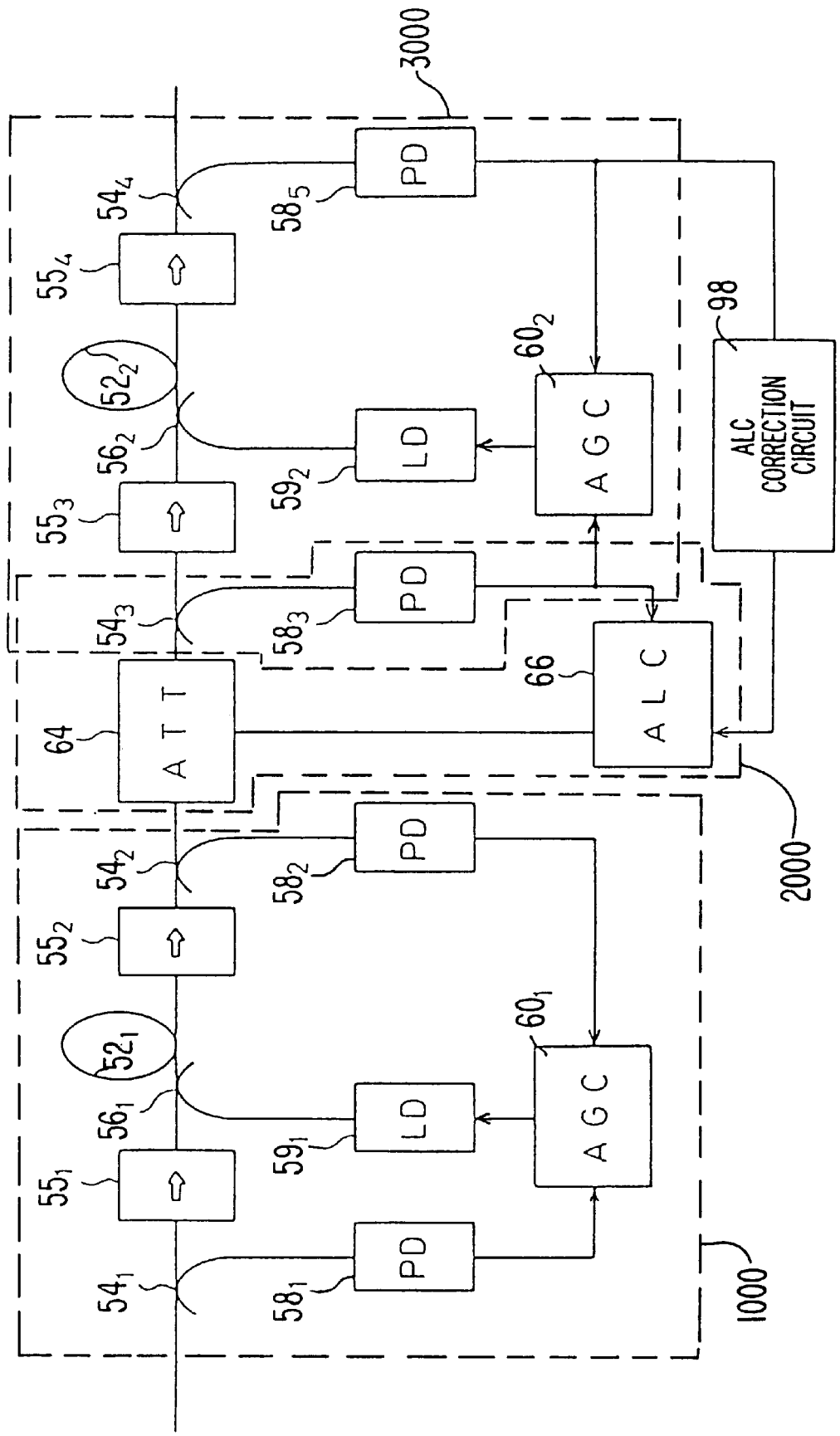
FIG. 11 is a diagram illustrating an optical amplifying apparatus, according to a further embodiment of the present invention.

FIG. 11 is a diagram illustrating an optical amplifying apparatus, according to a further embodiment of the present invention. Referring now to FIG. 11, the optical amplifying is apparatus includes first part 1000, second part 2000 and third part 3000, which are the same as that show in FIG. 10. However, the optical amplifying apparatus in FIG. 11 also includes an automatic level control (ALC) correction circuit 98 for controlling and correcting automatic level control circuit 66 of second part 2000.

More specifically, a portion of the wavelength-multiplexed optical signal output by optical attenuator 64 is branched by optical branching coupler 54$_3$, converted into an electrical signal by photodiode (PD) 58$_3$ and input to automatic level control circuit 66. Automatic level control circuit 66 controls optical attenuator 64 so that the total optical output power of the wavelength-multiplexed optical signal is maintained at a constant level. However, the optical output power of the output wavelength-multiplexed optical signal in third part 3000 is not fed to automatic level control circuit 66. Therefore, it cannot be ensured that the total optical output in the third part 3000 is maintained within a predetermined range.

Accordingly, a portion of the output wavelength multiplexed optical signal in the third part 3000 is converted into an electrical signal by photodiode (PD) 58$_5$ and input to ALC correction circuit 98 as well as to automatic gain control circuit 60$_2$. ALC correction circuit 98 determines whether or not the total optical output power is maintained within the predetermined range. If the total optical output power is not within the predetermined range, ALC correction circuit 98 controls automatic level control circuit 66 which, in turn, controls optical attenuator 64 to maintain the total optical output power within the predetermined range. If a semiconductor optical amplifier is used in place of optical attenuator 64, automatic level control circuit 66 controls the gain of the semiconductor optical amplifier so that the total optical output in third part 3000 is maintained within the predetermined level.

Figure 12:
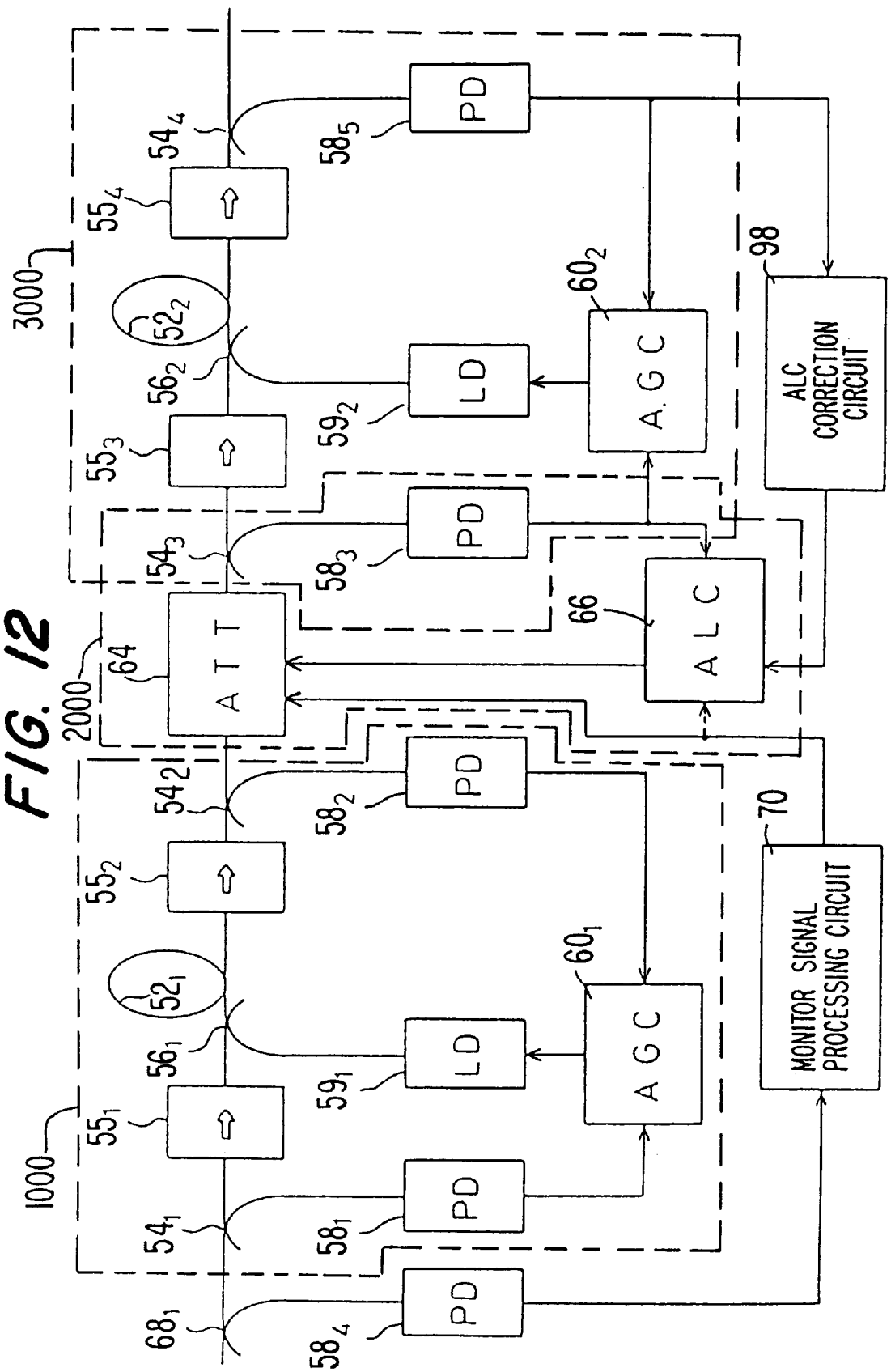
FIG. 12 is a diagram illustrating an optical amplifying apparatus, according to an embodiment of the present invention.

FIG. 12 is a diagram illustrating an optical amplifying apparatus, according to an embodiment of the present invention. The optical amplifying apparatus in FIG. 12 is a combination of the optical amplifying apparatuses in FIGS. 10 and 11.

Referring now to FIG. 12, in the event of a variation in the number of channels, monitor signal processing circuit 70 temporarily freezes the control effected by second part 2000 for controlling the optical output at a constant level, so that a variation in the optical output is reduced. Further, ALC correction circuit 98 controls automatic level control circuit 66 so as to maintain the total optical output power in third part 3000 within a predetermined range.

Figure 13:
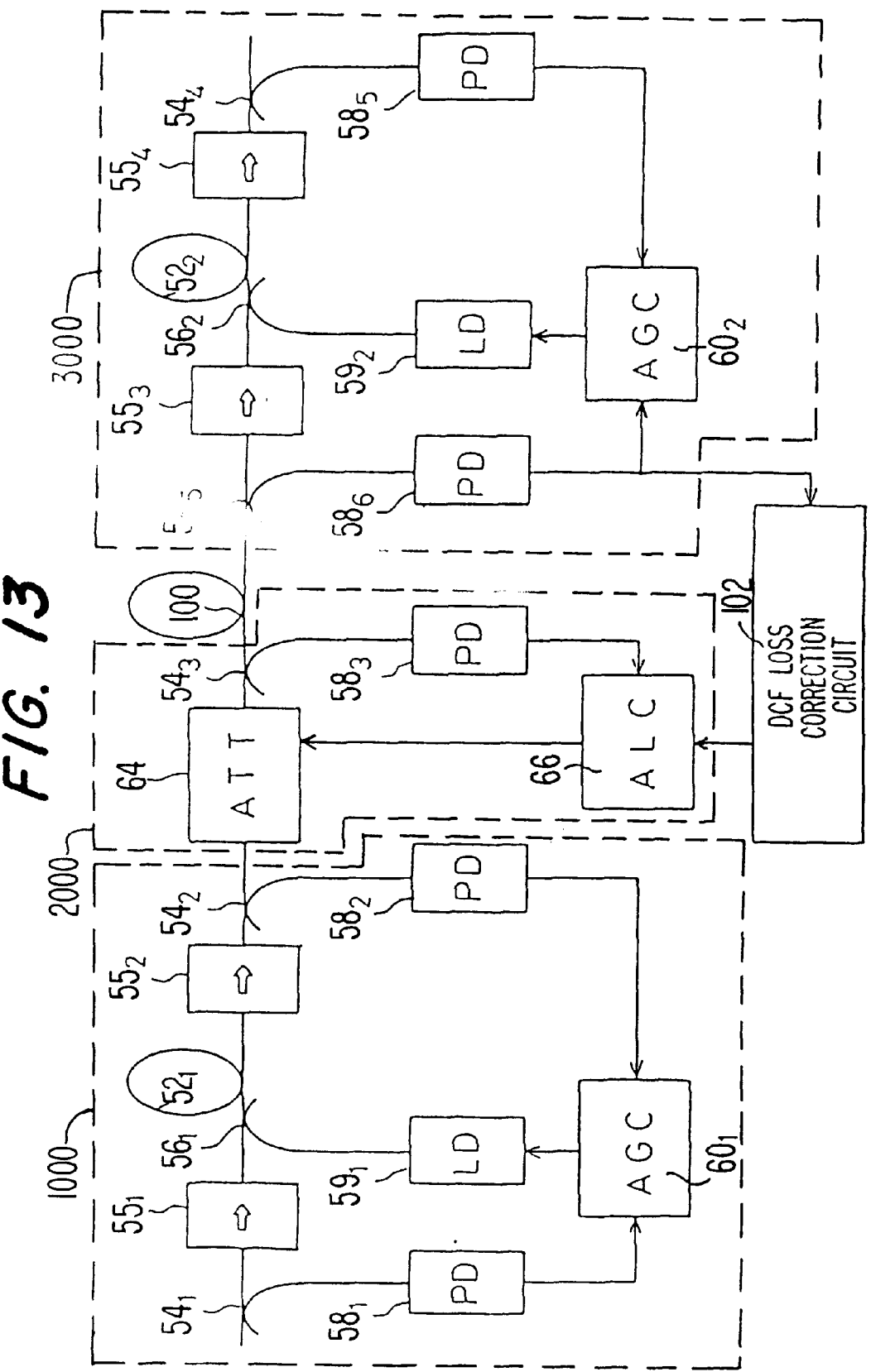
FIG. 13 is a diagram illustrating an optical amplifying apparatus, according to an additional embodiment of the present invention.

FIG. 13 is a diagram illustrating an optical amplifying apparatus, according to an additional embodiment of the present invention. The optical amplifying apparatus in FIG. 13 operates in a similar manner as previously described embodiments of the present invention, but also includes an optical branching coupler 54$_5$, a photodiode (PD) 58$_6$, a dispersion compensation fiber (DCF) 100 and a dispersion compensation fiber (DCF) loss correction circuit 102. Optical branching coupler $54_5$ and photodiode (PD) $58_6$ can be considered to be included in third part 3000.

Dispersion compensation fiber 100 is connected between second part 2000 and third part 3000. DCF loss correction circuit 102 controls automatic level control circuit 66. In a long-distance, high-capacity, wavelength-multiplexing optical transmission system, dispersion compensation in relation to the dispersion level of the transmission optical fiber and the wavelength-multiplexed optical signal is necessary. For this reason, dispersion compensation fiber 100 is provided.

However, insertion loss due to a distribution compensation optical fiber can cause problems. More specifically, a variation in a loss due to the distribution compensation optical fiber causes a variation in the optical output of repeaters which include wavelength-multiplexed optical fiber amplifiers.

Therefore, by measuring a loss due to dispersion compensation fiber 100 and setting automatic level control circuit 66 so as to compensate for the loss, optical attenuator 64 is controlled to provide a constant optical output. The loss due to dispersion compensation optical fiber 100 is likely to vary depending on a level of dispersion compensation. Accordingly, even with the constant optical output control effected by automatic level control circuit 66, the level of the wavelength-multiplexed optical signal input to third part 3000 may vary.

Therefore, a portion of the wavelength-multiplexed optical signal output by dispersion compensation optical fiber 100 and branched by optical branching coupler $54_5$ is converted into an electrical signal by photodiode (PD) $58_6$. The electrical signal is input to DCF loss correction circuit 102 as well as to automatic gain control circuit $60_2$. DCF loss correction circuit 102 determines whether or not the level of the wavelength-multiplexed optical signal output by dispersion compensation fiber 100 is within a predetermined range. If the level is outside the predetermined range, DCF loss correction circuit 102 supplies a correction signal to automatic level control circuit 66. For example, the reference voltage (set voltage) for constant control of the optical output is corrected such that the optical output power is within the predetermined range. Therefore, a variation in insertion loss that results in a construction where dispersion compensation fiber 100 compensates for the dispersion in the transmission optical fiber is corrected, and a predetermined output level of the amplified wavelength-multiplexed optical signal is obtained.

Figure 14:
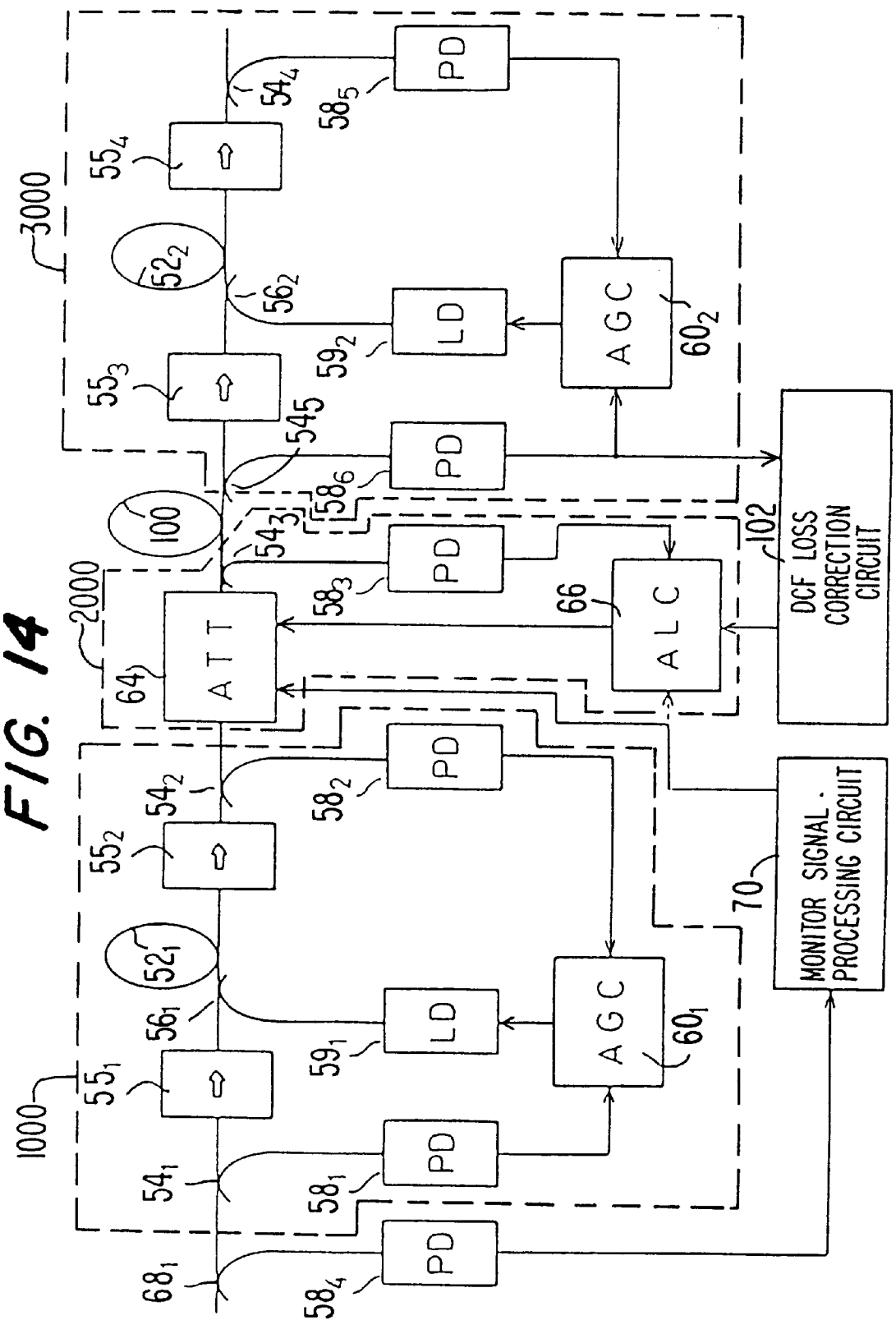
FIG. 14 is a diagram illustrating an optical amplifying apparatus, according to an additional embodiment of the present invention.

FIG. 14 is a diagram illustrating an optical amplifying apparatus, according to an additional embodiment of the present invention. Referring now to FIG. 14, when monitor signal processing circuit 70 extracts and identifies a control signal for giving warning of a variation in the number of channels, the operation of optical attenuator 64 is frozen (that is, the transmissivity or the attenuation is maintained to be constant), so that a rapid variation in the optical signal level is restricted. DCF loss correction circuit 102 controls automatic level control circuit 66 so as to correct a loss that varies depending on the level of dispersion compensation provided by dispersion compensation fiber 100. Thus, the level of the wavelength-multiplexed optical signal input to third part 3000 is maintained within a predetermined range.

Figure 15:
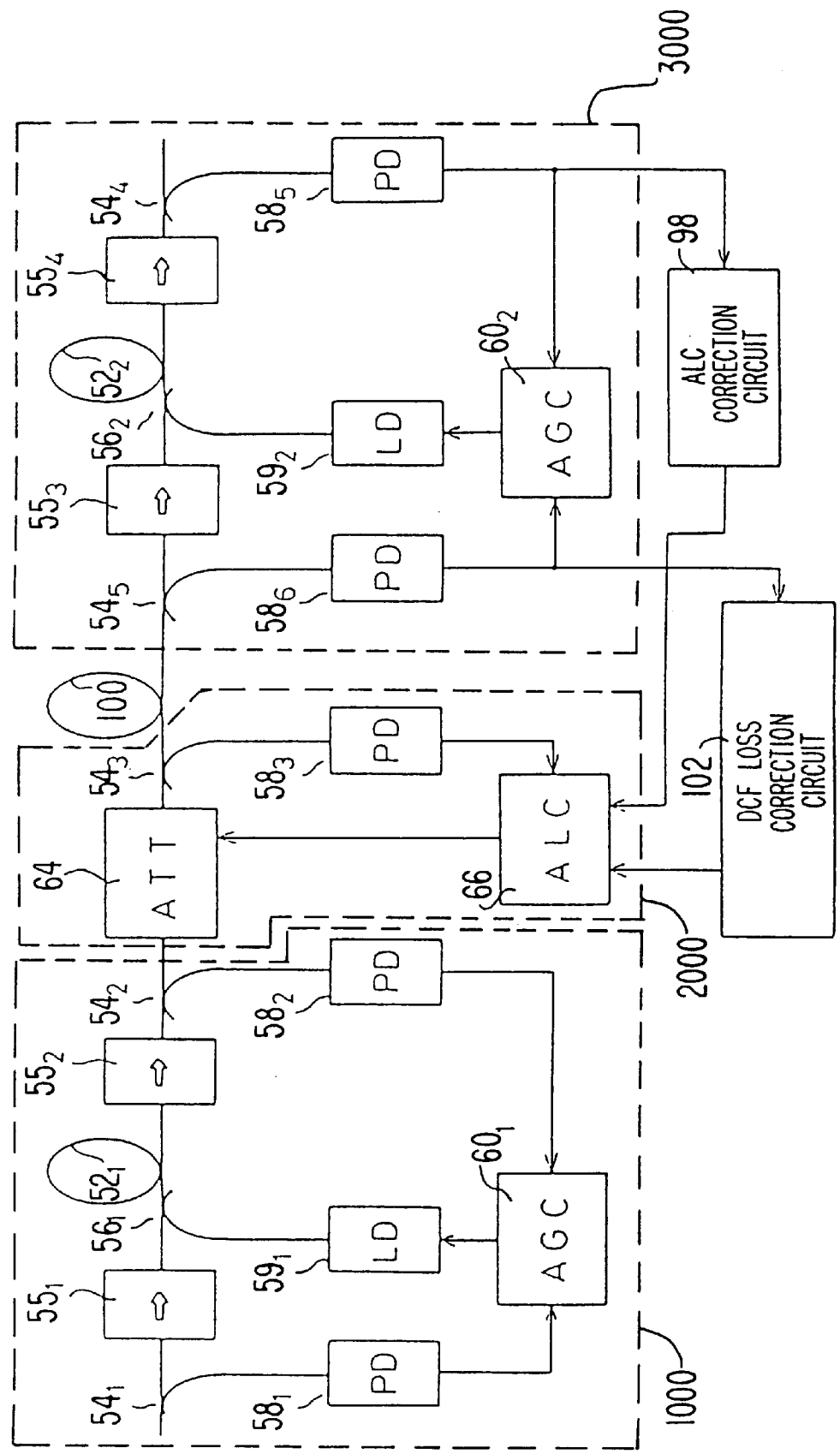
FIG. 15 is a diagram illustrating an optical amplifying apparatus, according to a further embodiment of the present invention.

FIG. 15 is a diagram illustrating an optical amplifying apparatus, according to a further embodiment of the present invention. Referring now to FIG. 15, dispersion compensation fiber 100 compensates for dispersion in the transmission optical fiber, DCF loss correction circuit 102 corrects a variation in the loss depending on the level of compensation provided by dispersion compensation fiber 100, and ALC correction circuit 98 controls automatic level control circuit 66 so as to maintain the level of the output wavelength-multiplexed optical signal in third part 3000 within a predetermined range. Thus, the wavelength-multiplexed optical signal in the wavelength-multiplexed optical transmission system is amplified, relayed and transmitted in a stable manner.

Figure 16:
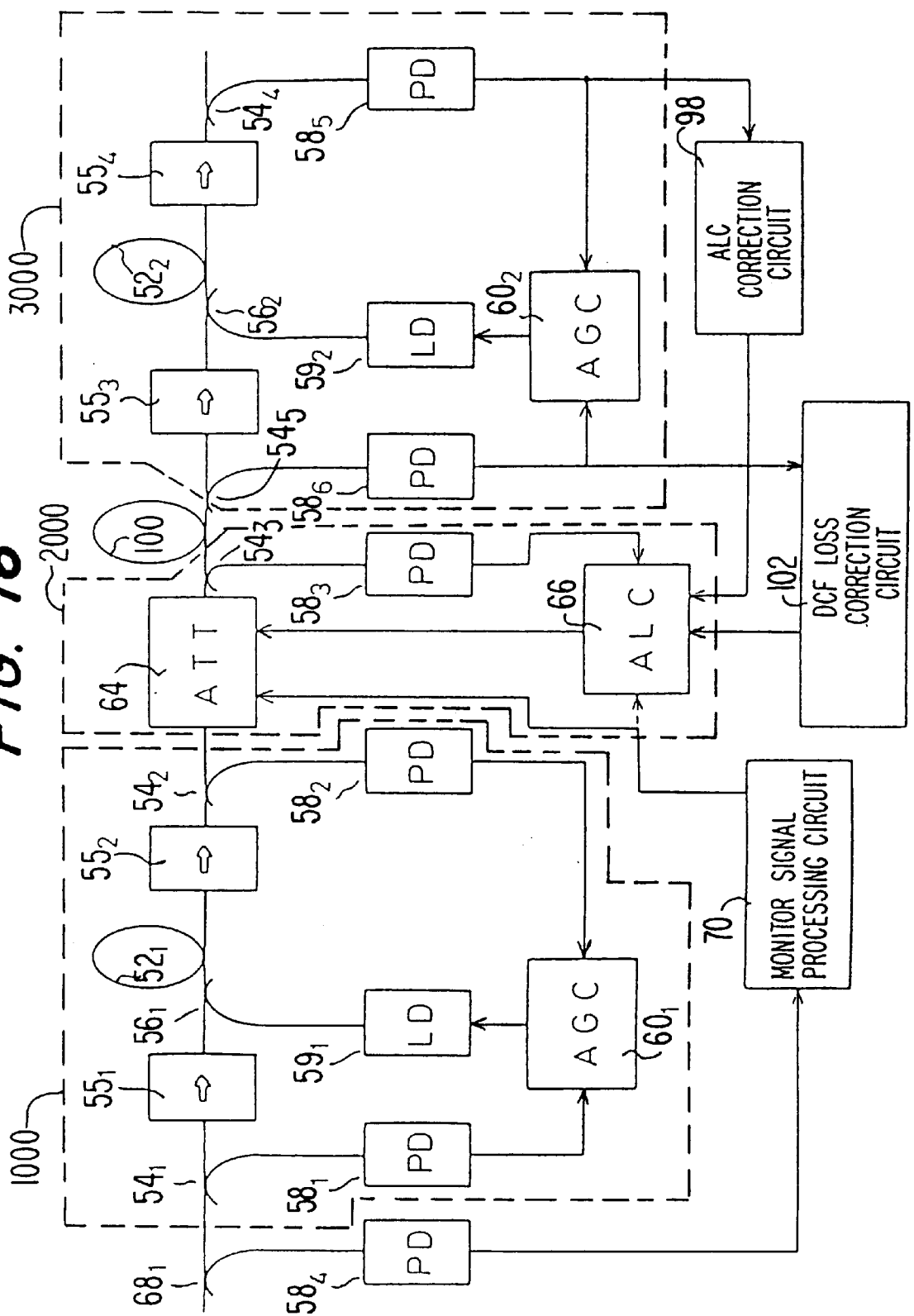
FIG. 16 is a diagram illustrating an optical amplifying apparatus, according to a still further embodiment of the present invention.

FIG. 16 is a diagram illustrating an optical amplifying apparatus, according to a still further embodiment of the present invention. Referring now to FIG. 16, monitor signal processing circuit 70 controls optical attenuator 64 or automatic level control circuit 66 upon extracting and identifying a control signal for giving warning of a variation in the number of channels, so as to freeze constant-level control of the optical output. In this manner, a rapid variation in the level of the optical output is restricted.

Further, DCF loss correction circuit 102 controls automatic level control circuit 66 so as to correct a variation in the loss that depends on the level of dispersion provided by dispersion compensation optical fiber 100. ALC correction circuit 98 controls automatic level control circuit 66 so as to maintain the output wavelength-multiplexed optical signal in third part 3000 within a predetermined range.

Figure 17:
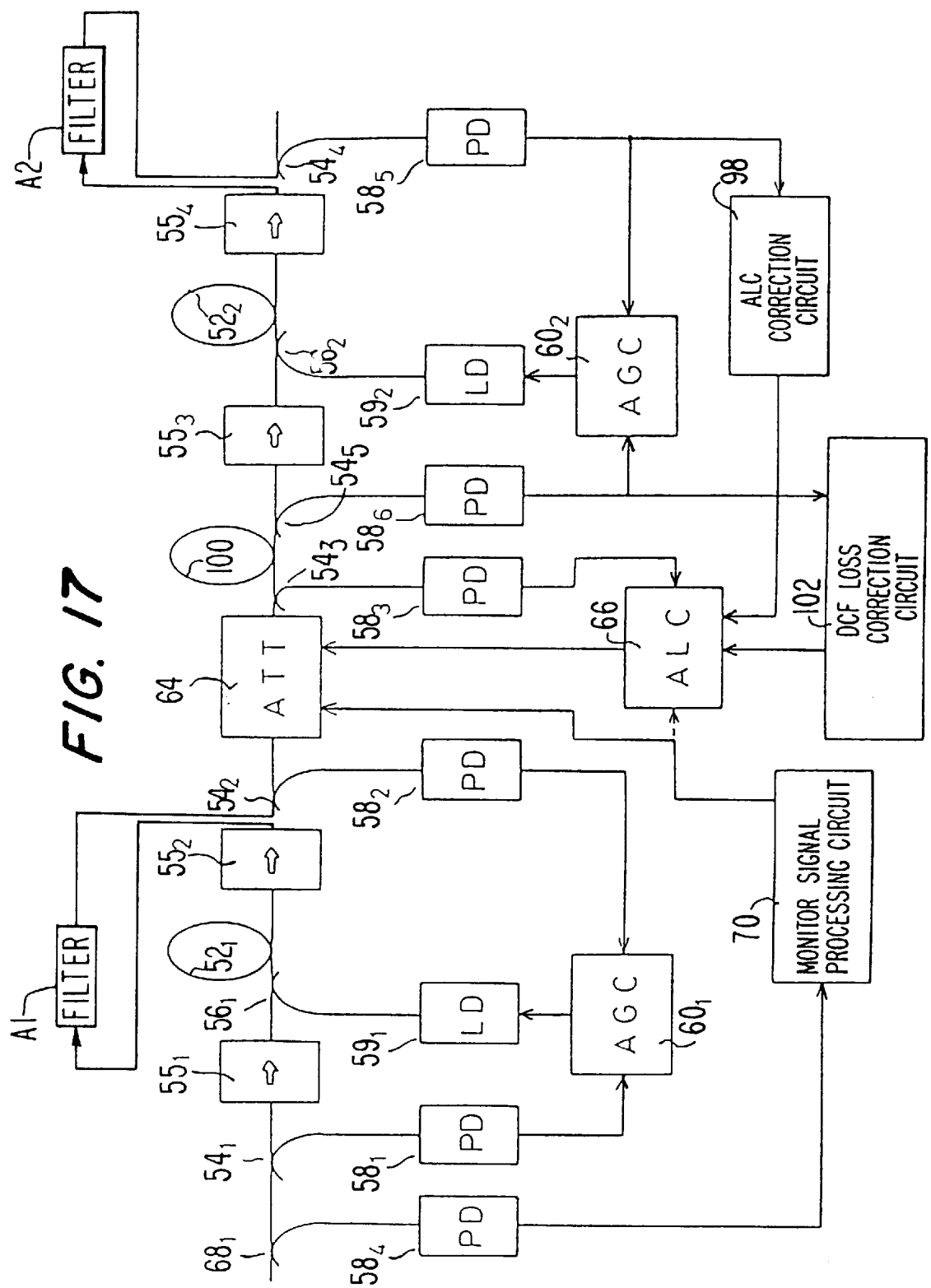
FIG. 17 is a diagram illustrating modification to the optical amplifying apparatus illustrated in FIG. 16, according to an embodiment of the present invention.

FIG. 17 is a diagram illustrating modification to the optical amplifying apparatus illustrated in FIG. 16, according to an embodiment of the present invention. More specifically, in FIG. 17, an optical filter A1 is provided between the output of optical isolator $55_2$ and optical branching coupler $54_2$, at the input of photodiode (PD) $58_2$. Also, an optical filter A2 is provided between the output of optical isolator $55_4$ and optical branching coupler $54_4$, at the input of photodiode (PD) $58_5$. Optical filters A1 and A2 are optical filters as disclosed, for example, in U.S. patent application Ser. No. 08/655,027, which is incorporated herein by reference, for correcting wavelength dependency of the gain.

Figure 18A:
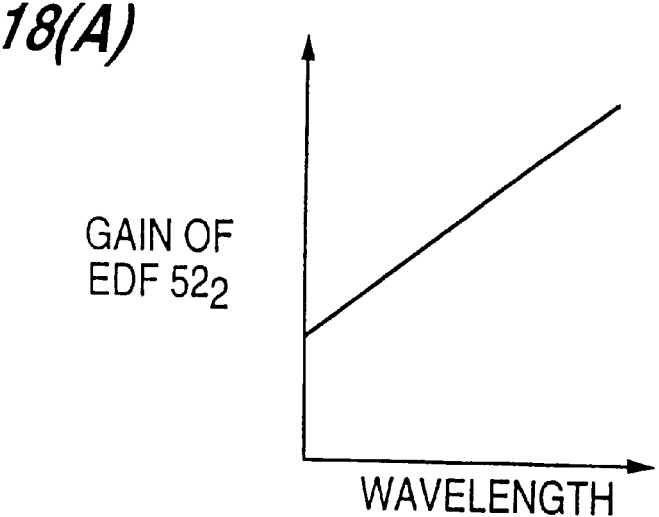
FIG. 18(A) is a graph illustrating gain versus wavelength characteristics of a rare-earth-doped optical fiber (EDF) in an optical amplifying apparatus, according to an embodiment of the present invention.
Figure 18B:
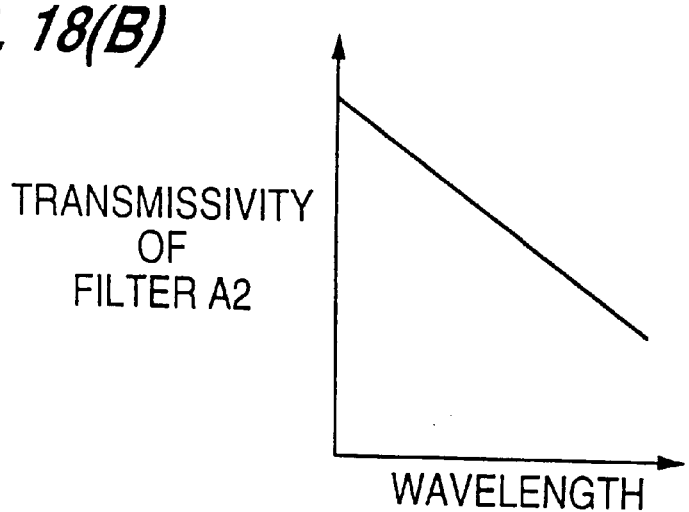
FIG. 18(B) is a graph illustrating the transmissivity of an optical filter in an optical amplifying apparatus, according to an embodiment of the present invention.
Figure 18C:
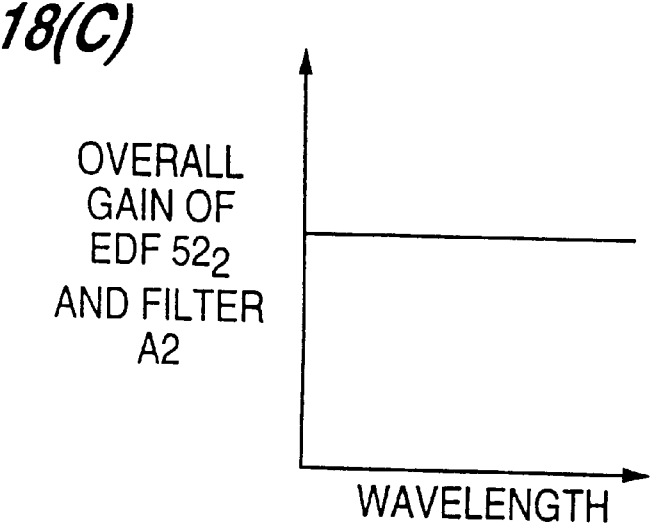
FIG. 18(C) is a graph illustrating overall gain of the rare-earth-doped optical fiber (EDF) in FIG. 18(A) and the optical filter in FIG. 18(B), according to an embodiment of the present invention.

FIG. 18(A) is a graph illustrating gain versus wavelength characteristics of rare-earth-doped optical fiber (EDF) $52_2$ in FIG. 17, FIG. 18(B) is a graph illustrating the transmissivity versus wavelength of optical filter A2 in FIG. 17, and FIG. 18(C) is a graph illustrating overall gain of rare-earth-doped optical fiber (EDF) $52_2$ and optical filter A2 in FIG. 17, according to an embodiment of the present invention.

If, for example, rare-earth-doped optical fiber (EDF) $52_2$ has a wavelength-dependent gain characteristic as shown in FIG. 18(A), wherein the gain is higher in the long wavelength range, providing a gain correction optical filter A2 at the input of photodiode (PD) $58_5$ ensures that the amplifier has an even gain with respect to wavelength. Providing optical filter A2 ensures that photodiode (PD) $58_5$ receives the corrected multi-wavelength signal so that the unfavorable sensitivity characteristic, wherein the signal sensitivity is low in the short wavelength range and high in the long wavelength range, is corrected. Optical filters A1 and/or A2 may or may not be provided, depending on the use of rare-earth-doped optical fibers (EDF) $52_1$ and $52_2$.

Figure 19:
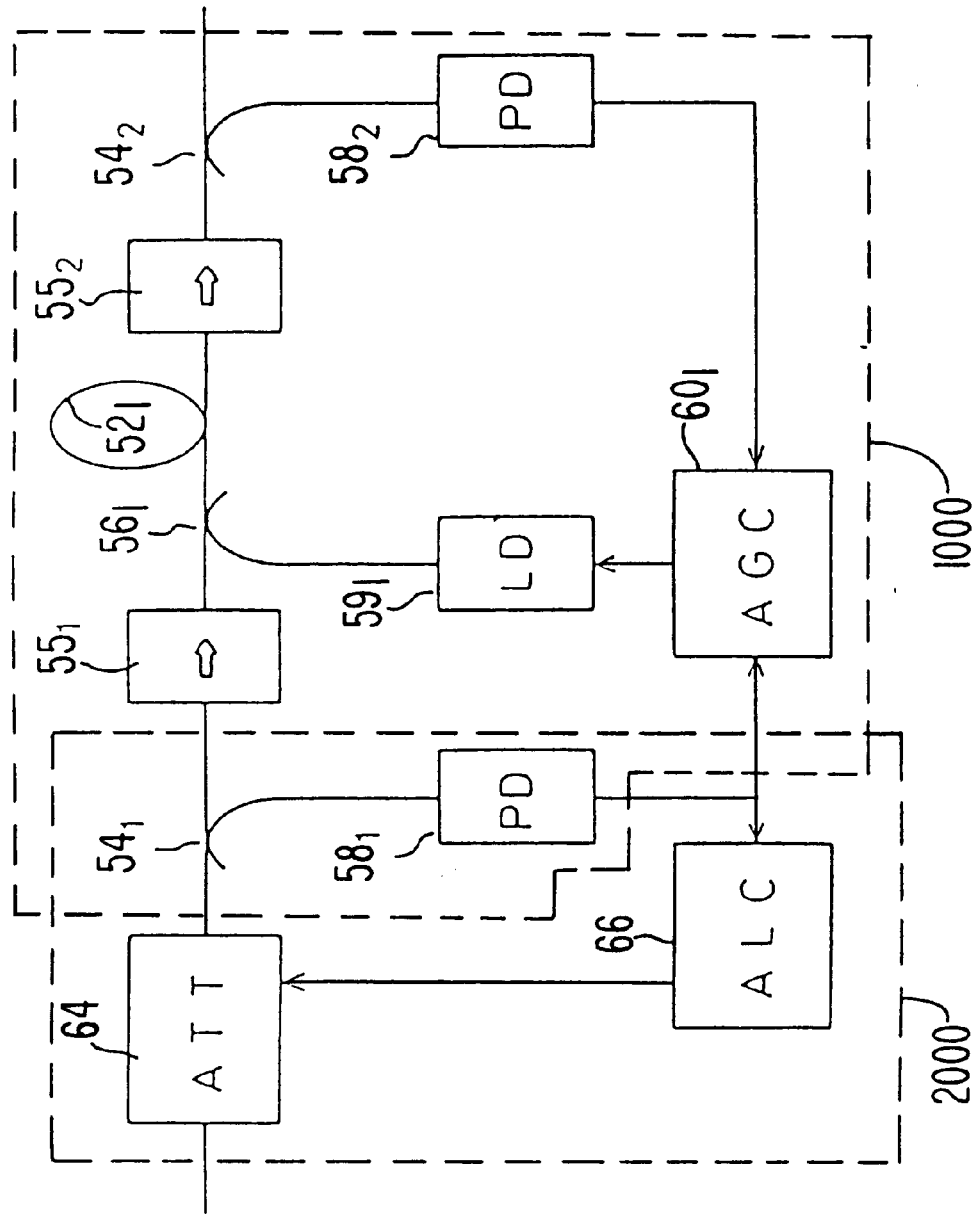
FIG. 19 is a diagram illustrating an optical amplifying apparatus, according to an embodiment of the present invention.

FIG. 19 is a diagram illustrating an optical amplifying apparatus, according to an embodiment of the present invention. Referring now to FIG. 19, the positioning of the first part 1000 and the second part 2000 are essentially switched. Therefore, a wavelength-multiplexed optical signal is controlled to have a constant power level by second part 2000, and is then controlled by first part 1000 to have a constant gain.

More specifically, an input wavelength-multiplexed optical signal is transmitted to optical attenuator 64. The wavelength-multiplexed optical signal output from optical attenuator 64 is transmitted to rare-earth-doped optical fiber 52$_1$ via optical isolator 55$_1$ and optical wavelength multiplexing coupler 56$_1$. The amplified wavelength-multiplexed optical signal is output via optical isolator 55$_2$ and optical branching coupler 54$_2$.

A portion of the wavelength-multiplexed optical signal branched by optical branching coupler 54$_1$ is converted into an electrical signal by photodiode 58$_1$ and fed to automatic level control circuit 66 and automatic gain control circuit 60$_1$. Automatic level control circuit 66 controls the optical attenuation provided by optical attenuator 64 so that the wavelength-multiplexed optical signal has its level controlled to be within a predetermined range and is then transmitted to first part 1000.

A portion of the wavelength-multiplexed optical signal branched by optical branching coupler 54$_2$ is converted into an electrical signal by photodiode 58$_2$ and transmitted to automatic gain control circuit 60$_1$. Automatic gain control circuit 60$_1$ controls pump laser diode 59$_1$ so that a ratio between a level of the wavelength-multiplexed optical signal input to, and output from, rare-earth-doped optical fiber 52$_1$ is maintained at a constant level.

Therefore, second part 2000 causes the power level of the wavelength-multiplexed optical signal to be constant even when a signal input via a transmission optical fiber varies greatly. As a result, a wavelength-multiplexed optical signal having a constant level is input to first part 1000. Accordingly, automatic gain control circuit 60$_1$ may have a small control zone and a relatively simple construction. Further, since the power level of the optical signal input to rare-earth-doped optical fiber 52$_1$ is prevented from exceeding a predetermined level, it is not necessary to raise the level of the pump laser beam supplied by pump laser diode 59$_1$. That is, pump laser diode 59$_1$ may have a small capacity.

Figure 20:
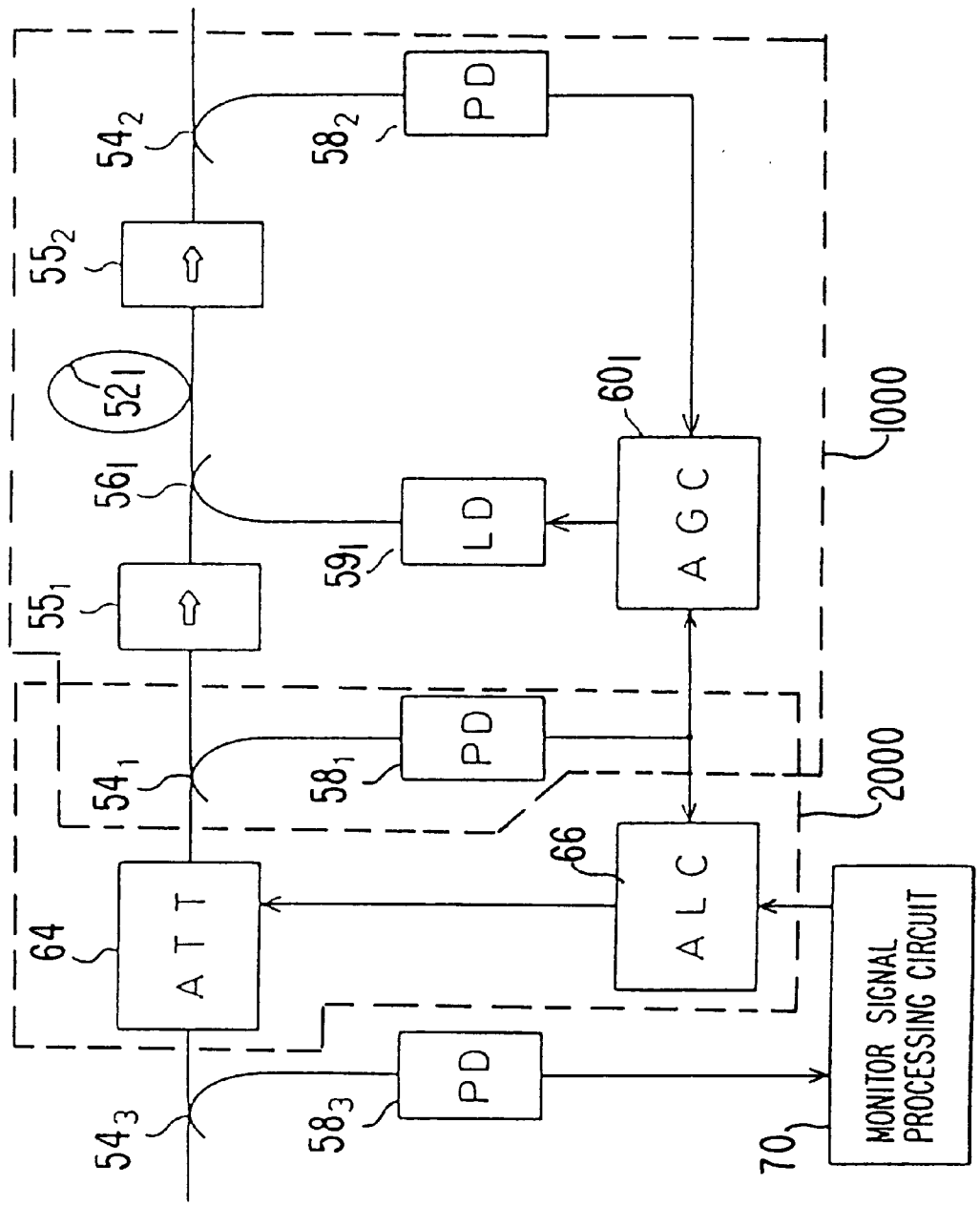
FIG. 20 is a diagram illustrating an optical amplifying apparatus, according to an additional embodiment of the present invention.

FIG. 20 is a diagram illustrating an optical amplifying apparatus, according to an additional embodiment of the present invention. The optical amplifying apparatus illustrated in FIG. 20 is similar to the optical amplifying apparatus in FIG. 19, but also includes optical branching coupler 54$_3$, photodiode (PD) 58$_3$ and monitor signal processing circuit 70.

Referring now to FIG. 20, a wavelength-multiplexed optical signal supplied via a transmission optical fiber is input to variable optical attenuator 64 and has a portion branched by optical branching coupler 54$_3$ converted into an electrical signal by photodiode 58$_3$ and input to monitor signal processing circuit 70.

A control signal for giving warning of a variation in the number of channels may be superimposed on the wavelength-multiplexed optical signal by amplitude modulation or transmitted on a dedicated control channel. Upon extracting and identifying the control signal for giving warning of a variation in the number of channels, monitor signal processing circuit 70 controls automatic level control circuit 66 and retains the optical attenuation provided by optical attenuator 64 at the current level (thereby freezing the operation of optical attenuator 64) so that the optical output power is no longer maintained at a constant level.

When the change in the number of channels is completed, monitor signal processing circuit 70 allows optical attenuator 64 to resume its control for maintaining the optical output power at a constant level. With this arrangement, it is possible to reduce or eliminate a rapid variation in the power level of the optical signal.

Figure 21:
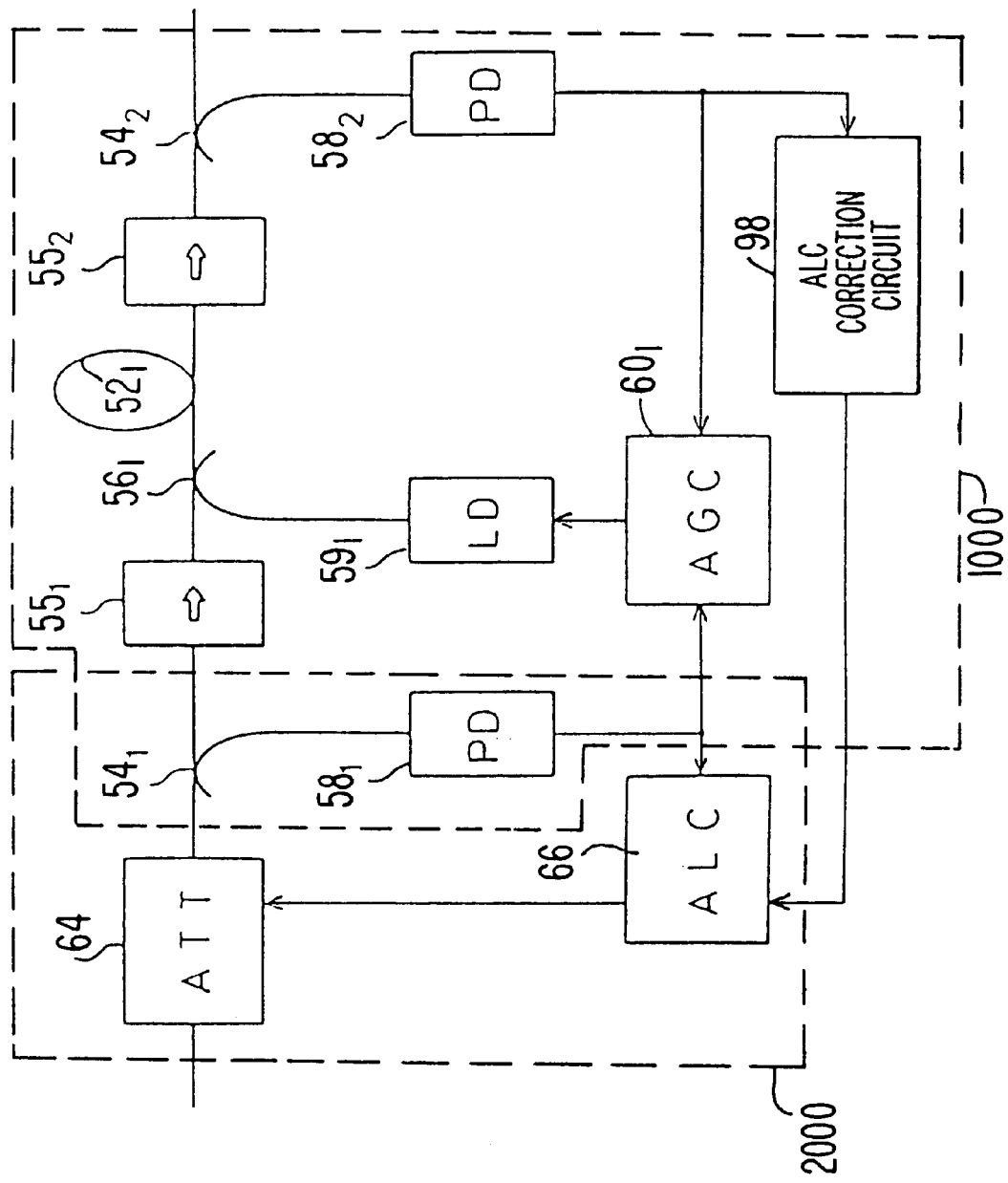
FIG. 21 is a diagram illustrating an optical amplifying apparatus, according to a further embodiment of the present invention.

FIG. 21 is a diagram illustrating an optical amplifying apparatus, according to a further embodiment of the present invention. The optical amplifying apparatus illustrated in FIG. 21 is similar to the optical amplifying apparatus in FIG. 19, but includes ALC correction circuit 98.

ALC correction circuit 98 determines whether or not the power level of the output wavelength-multiplexed optical signal is within a predetermined range. If the power level is not within the predetermined range, ALC correction circuit 98 controls automatic level control circuit 66 so that the optical attenuation provided by optical attenuator 64 causes the output wavelength-multiplexed optical signal to have a power level within a predetermined range.

Figure 22:
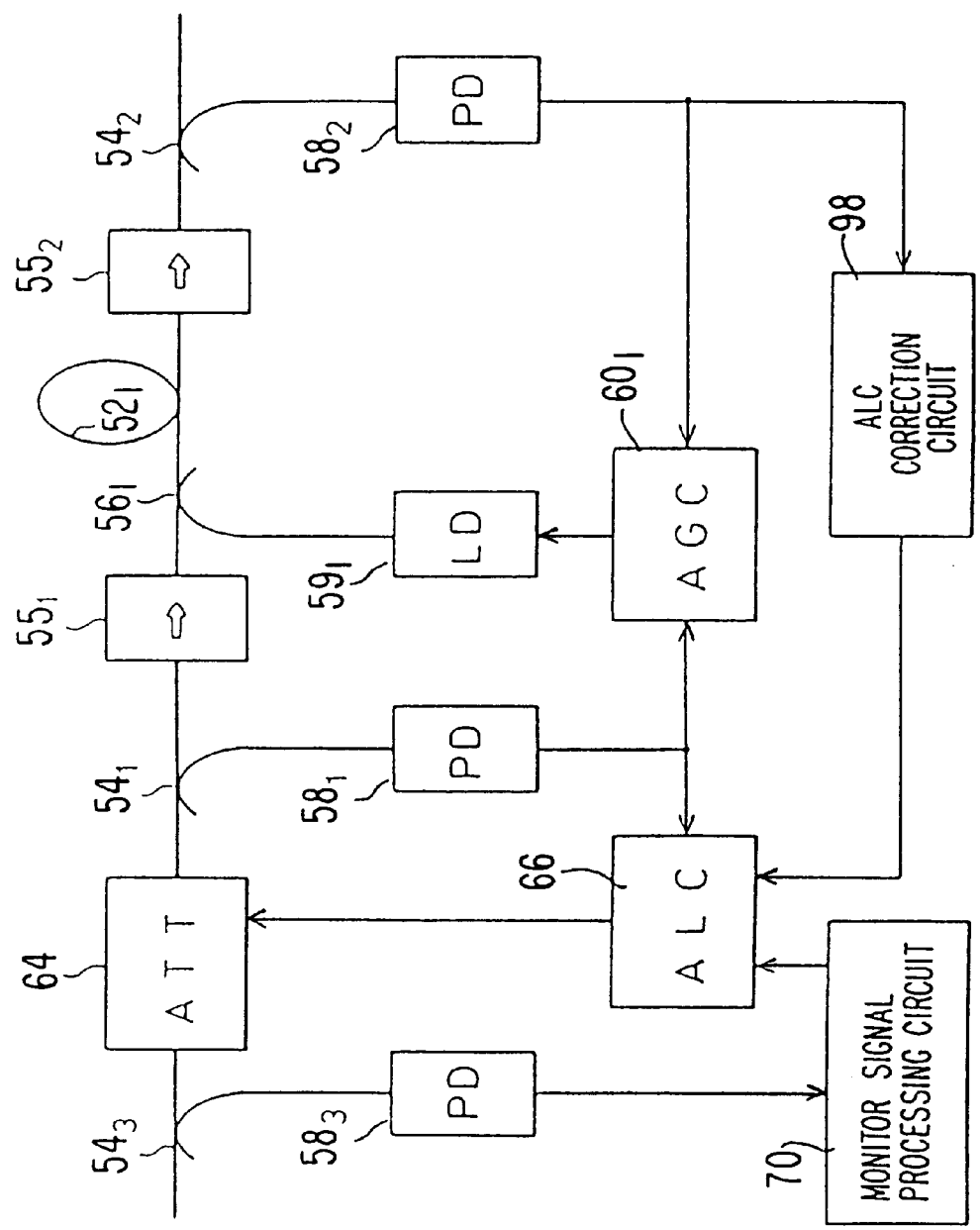
FIG. 22 is a diagram illustrating an optical amplifying apparatus, according to a still further embodiment of the present invention.

FIG. 22 is a diagram illustrating an optical amplifying apparatus, according to a still further embodiment of the present invention. The optical amplifying apparatus illustrated in FIG. 22 is a combination of the optical amplifying apparatuses illustrated in FIGS. 20 and 21.

Referring now to FIG. 22, ALC correction circuit 98 controls automatic level control circuit 66 so that the power level of the output wavelength-multiplexed optical signal is within a predetermined range. Upon extracting and identifying a control signal for giving warning of a variation in the number of channels, monitor signal processing circuit 70 freezes the automatic level control function so that the optical output power is not longer maintained at a constant level.

Figure 23:
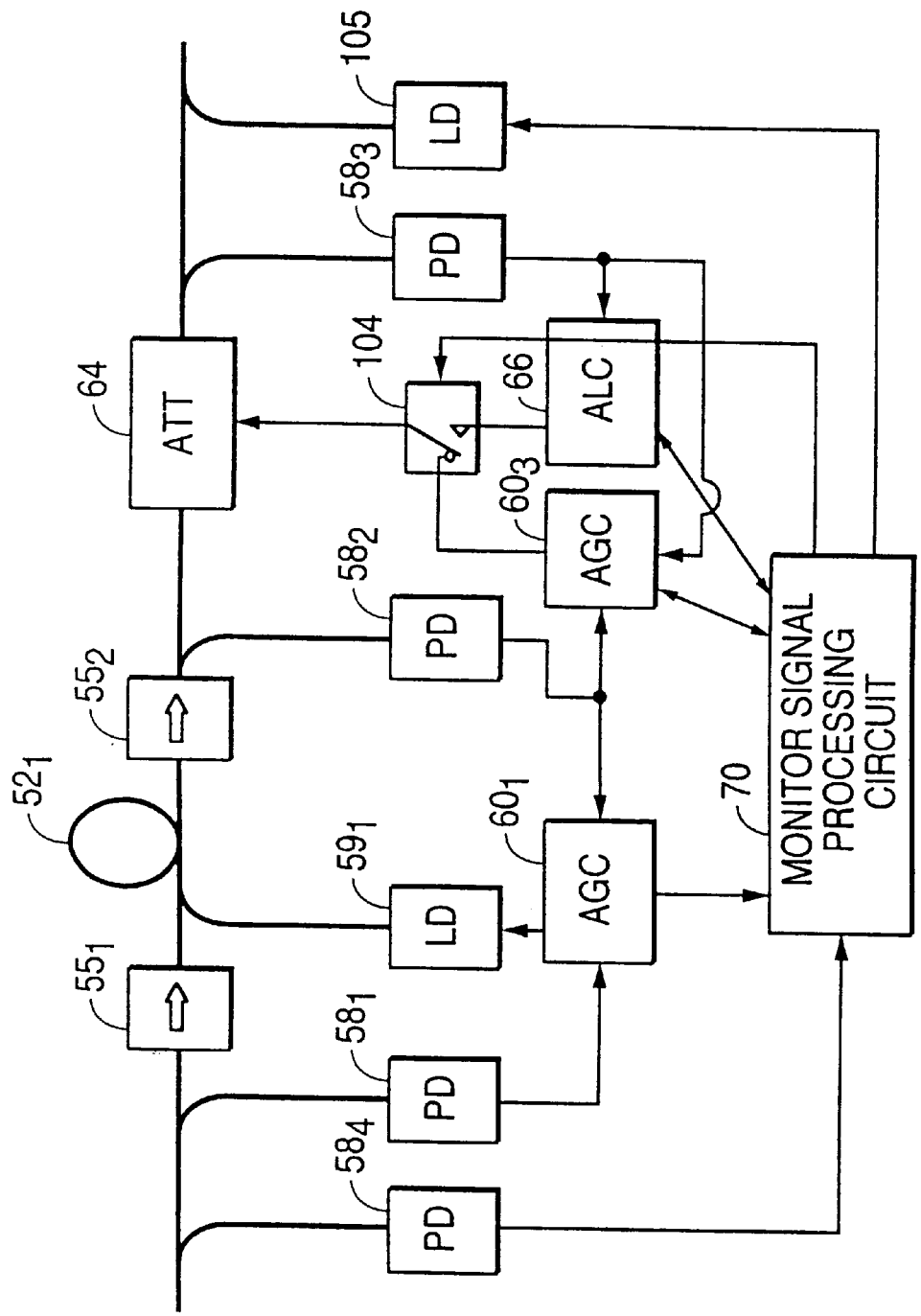
FIG. 23 is a diagram illustrating an optical amplifying apparatus, according to an embodiment of the present invention.

FIG. 23 is a diagram illustrating an optical amplifying apparatus, according to an embodiment of the present invention. Referring now to FIG. 23, instead of controlling (freezing) the optical attenuator 64 so as to provide a constant attenuation when the number of channels is varied, the optical amplifier as a whole is changed to the AGC mode when the number of channels is varied. Such a change can be achieved by controlling the ratio between the input to, and the output from, optical attenuator 64, to be at a constant level. Such an operation is tantamount to maintaining the gain G ($0 \leq G \leq 1$) of optical attenuator 64 or the light transmissivity of optical attenuator 64 at a constant level.

Therefore, in FIG. 23, a switch 104 is controlled by monitor signal processing circuit 70 to switch between automatic level control provided by automatic level control circuit 66 and automatic gain control provided by an automatic gain control circuit 60$_3$. More specifically, for example, as illustrated in FIG. 4(A), monitor signal processing circuit 70 causes switch 104 to select automatic level control circuit 66 prior to, and subsequent to, a variation in the number of channels. While the number of channels is being varied, monitor signal processing circuit 70 causes switch 104 to select automatic gain control circuit 60$_3$.

FIG. 23 also illustrates a laser diode (LD) 105 which is controlled by monitor signal processing circuit 70 to transmit information to downstream optical components, such as downstream optical repeaters. For example, as described in more detail further below, laser diode (LD) 105 can be used by monitor signal processing circuit 70 to transmit information to downstream optical components.

Figure 24:
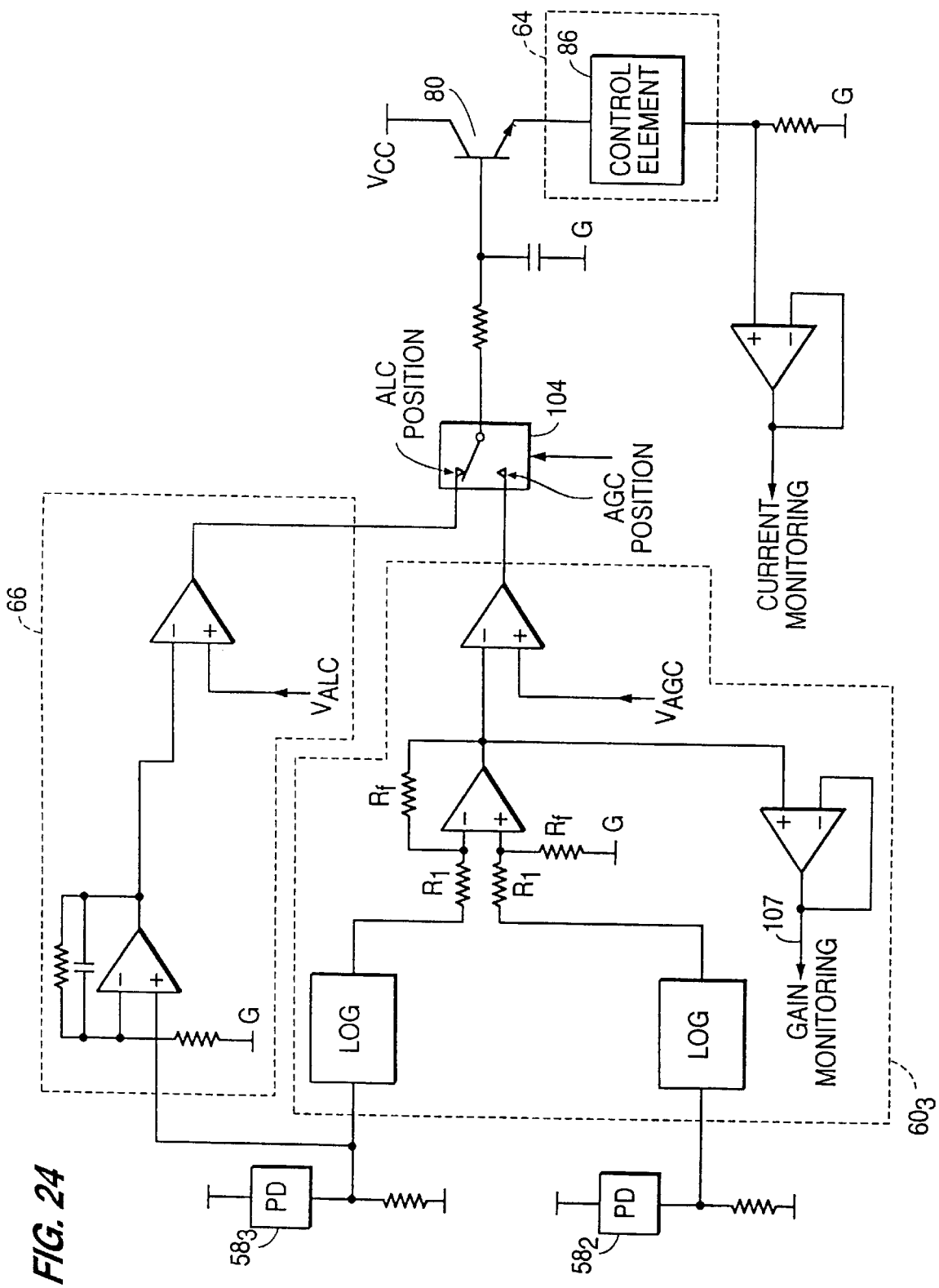
FIG. 24 is a more detailed diagram of a portion of the optical amplifying apparatus in FIG. 23, according to an embodiment of the present invention.

FIG. 24 is a more detailed diagram of the optical amplifying apparatus in FIG. 23. Referring now to FIG. 24, the operation is as follows:

(1) Normally (that is, when the number of channels are not being varied), switch 104 selects automatic level control circuit 66 so that the power level of light output from optical attenuator 64 is monitored and maintained at a constant level.

(2) When monitor signal processing circuit 70 receives a signal warning of a change in the number of channels, a gain monitoring signal 107 of automatic gain control circuit 60$_3$ is read so that an average gain (attenuation)

with respect to a time constant on the order of 10–100 ms is determined.

(3) A reference voltage $V_{AGC}$ corresponding to the average gain determined in (2) is output from monitor signal processing circuit 70 to automatic gain control circuit $60_3$.

(4) Switch 104 then selects automatic gain control circuit $60_3$.

(5) Monitor signal processing circuit 70 receives information indicating the new number of channels to be included in the wavelength-multiplexed optical signal.

(6) Monitors signal processing circuit 70 provides to automatic level control circuit 66 a reference voltage $V_{ALC}$ corresponding to the new number of channels.

(7) Monitor signal processing circuit 70 receives a signal indicating that the variation in the number of channels is complete. Alternatively, a predetermined period of time lapses from the receipt of the signal warning of the change in the number of channels.

(8) Switch 104 selects automatic level control circuit 66.

The relationship between an attenuation provided by optical attenuator 64 and a driving current of control element 86 provided by transistor 80 may depend on a parameter such as an operating temperature, but is generally a one-to-one relationship. Therefore, (2), above, may be replaced by a process whereby the driving current is monitored (with respect to the time constant on the order of 10–100 ms) so as to determine an average gain (attenuation) based on the monitored driving current. The driving current may be controlled so that its average level is maintained constant.

Figure 25:
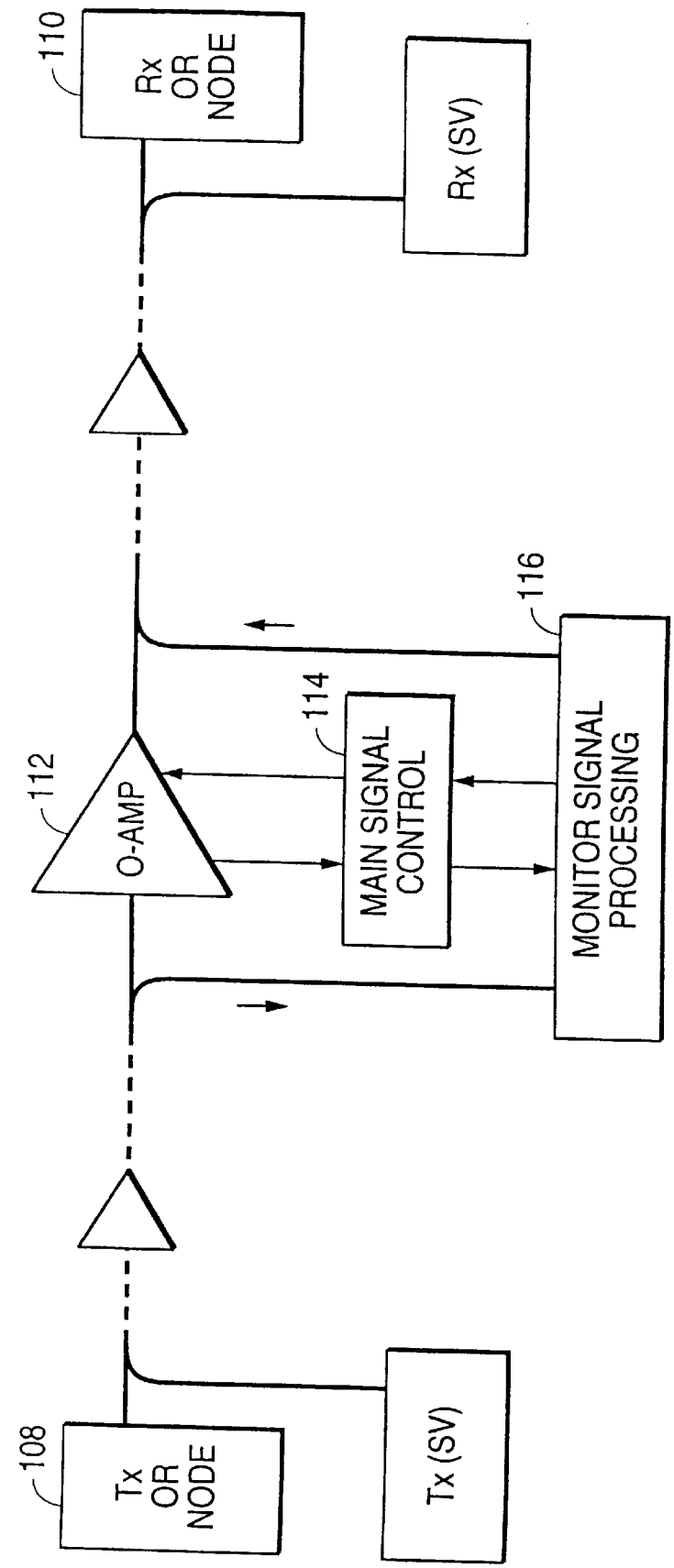
FIG. 25 is a diagram illustrating a fiber optic communication system employing an optical amplifying apparatus according to an embodiment of the present invention.

FIG. 25 is a diagram illustrating a fiber optical communication system employing an optical amplifying apparatus according to embodiments of the present invention. Referring now to FIG. 25, a transmitter (Tx) 108 transmits an SV light beam to a receiver (Rx) 110, where an SV light beam is light that is wavelength-multiplexed with a main signal. The main signal is used to transmit information downstream. An optical amplifier (O-AMP) 112 amplifies the SV light beam. Main signal control 114 and monitor signal processing 116 are performed.

Figure 26:
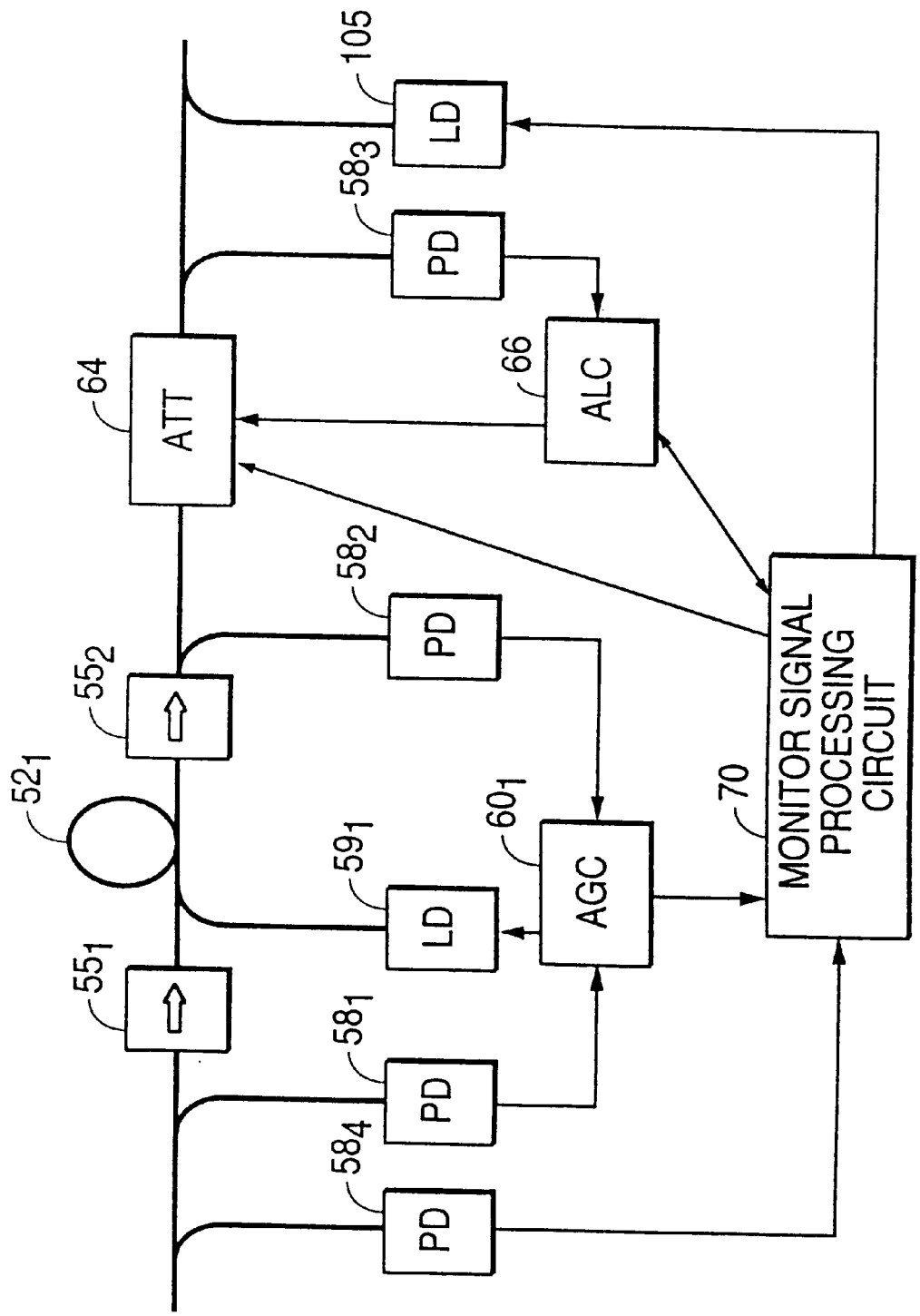
FIG. 26 is a more detailed diagram illustrating the optical amplifying apparatus of FIG. 25, according to an embodiment of the present invention.

FIG. 26 is a more detailed diagram illustrating an optical amplifying apparatus which includes optical amplifier 112, main signal control 114 and monitor signal processing 116 of FIG. 25. The optical amplifying apparatus in FIG. 26 is similar to the optical amplifying apparatus in FIG. 3, but includes laser diode (LD) 105 for sending an SV light beam downstream.

More specifically, monitor signal processing circuit 70 inserts, in the SV light beam, information indicating when the attenuation, or light transmissivity, of the optical attenuator 64 will be held constant, or "frozen". The SV light beam, carrying that information, is transmitted by laser diode (LD) 105 to the transmission line.

Figure 27:
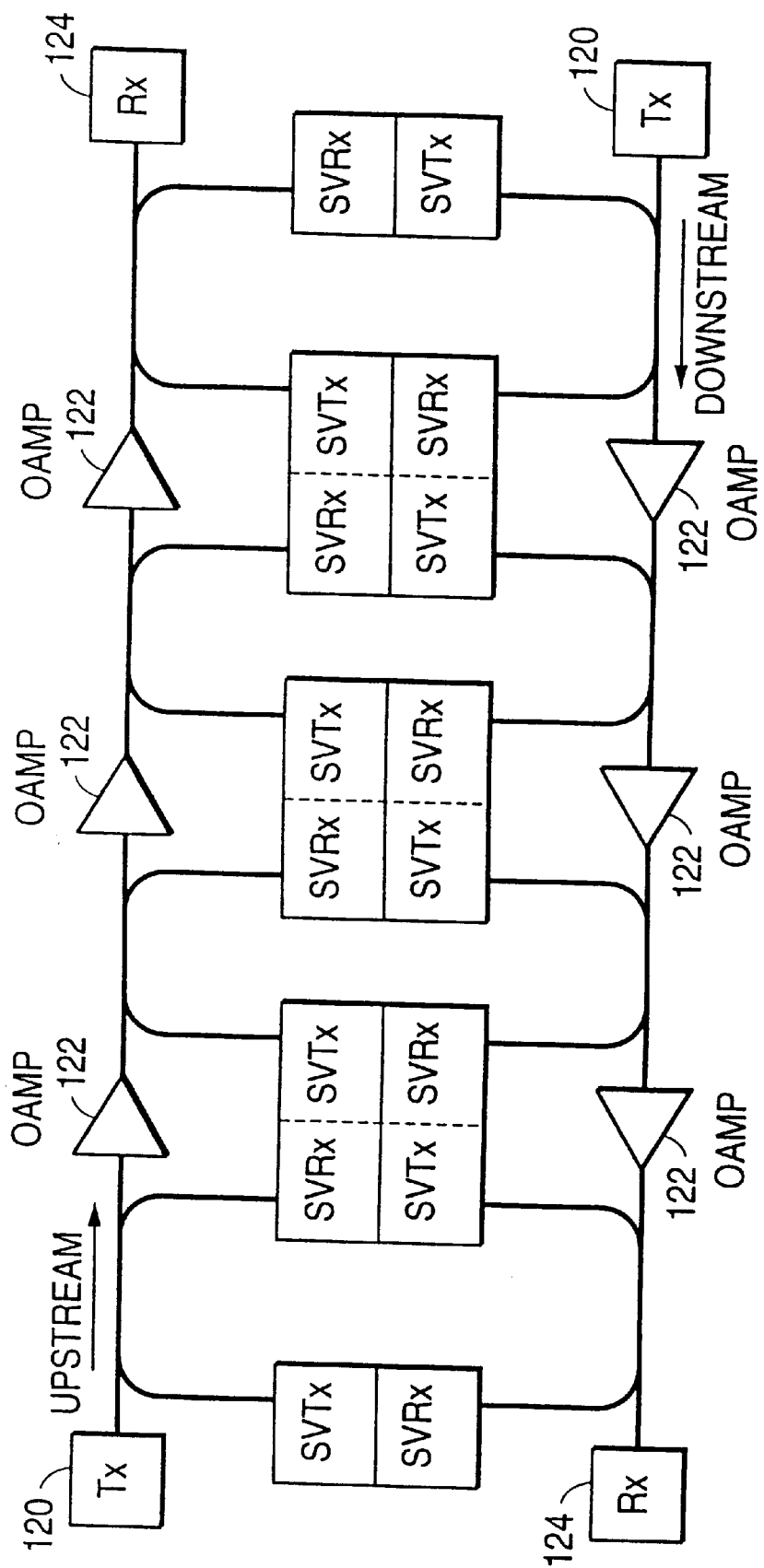
FIG. 27 is a diagram illustrating a transmission line employing a plurality of optical amplifying apparatuses, according to an embodiment of the present invention.

FIG. 27 is a diagram illustrating a transmission line employing a plurality of optical amplifying apparatuses, according to embodiments of the present invention. Referring now to FIG. 27, a wavelength-multiplexed optical communication system includes transmitters Tx 120, wavelength-multiplexed optical fiber amplifiers/repeaters OAMPs 122 and receivers Rx 124. When a variation in the number of channels is processed, all the OAMPs 122 in the upstream (or downstream) line in the system are set into a constant optical gain control.

A wavelength-multiplexed optical postamplifier (not illustrated) that may be provided in each transmitter Tx 120 and a wavelength-multiplexed optical preamplifier (not illustrated) that may be provided in each receiver Rx 124 are also set into a constant gain control. When all OAMPS 122 are in a constant gain control state, the power of an optical signal fed to a light receiving element in receivers Rx 124 may vary.

In a transmission line having optical amplifying apparatuses as illustrated in FIG. 25–27, it is possible to determine whether or not all the optical fiber amplifiers in the path managed by a receiving end (Rx) on the transmission line have their attenuation fixed and their optical gain maintained at a constant level. Once it is determined that all the optical fiber amplifiers have their optical gain maintained at a constant level, information indicating the same is sent to the transmitting end (Tx) via the backward path, whereupon a variation in the number of channels can be started.

The following is an example of the operation flow in a transmission line having optical amplifying apparatuses as illustrated in FIGS. 25–27, for processing a variation in the number of channels.

(1) A signal warning of a variation in the number of channels is issued from the upstream SV transmitting end (SVTx).

(2) Monitor signal processing circuit 70 of each OAMP receives the signal warning of the variation in the number of channels.

(3) Each OAMP starts "freezing" the operation of the associated optical attenuator.

(4) Each OAMP completes a freezing operation of the associated optical attenuator and sends downstream information indicating that the constant optical gain control is started by carrying that information on the monitor signal (an identification number for identifying the individual OAMPs is also inserted on the monitor signal).

(5) The upstream SV receiving end (SVRx) acknowledges that all of the upstream OAMPS are in the constant optical gain state.

(6) The downstream SV transmitting end (SVTx) announces that all the upstream OAMPs are in the constant optical gain state.

(7) The downstream SV receiving end (SVRx) acknowledges that all the upstream OAMPS are in the constant optical gain state.

(8) The upstream transmitting end (Tx) actually varies the number of channels.

(9) The upstream SV transmitting end (SVTx) issues information indicating that the variation in the number of channels is completed.

(10) The monitor signal processing circuit 70 in each OAMP receives the information indicating that the variation in the number of channels is completed.

(11) Each OAMP cancels the freezing operation for freezing the operation of the associated optical attenuator and proceeds to the constant optical output control.

(12) Each OAMP sends downstream information indicating that a shift to the constant optical output control is completed, in the form of the monitor signal (an identification signal identifying the individual OAMPs is also sent).

(13) The upstream SV receiving end (SVRx) receives the information indicating that all the OAMPs have processed the variation in the number of channels.

(14) The information indicating that all of the OAMPs have processed the variation in the number of channels is sent to the transmitting end.

Figure 28:
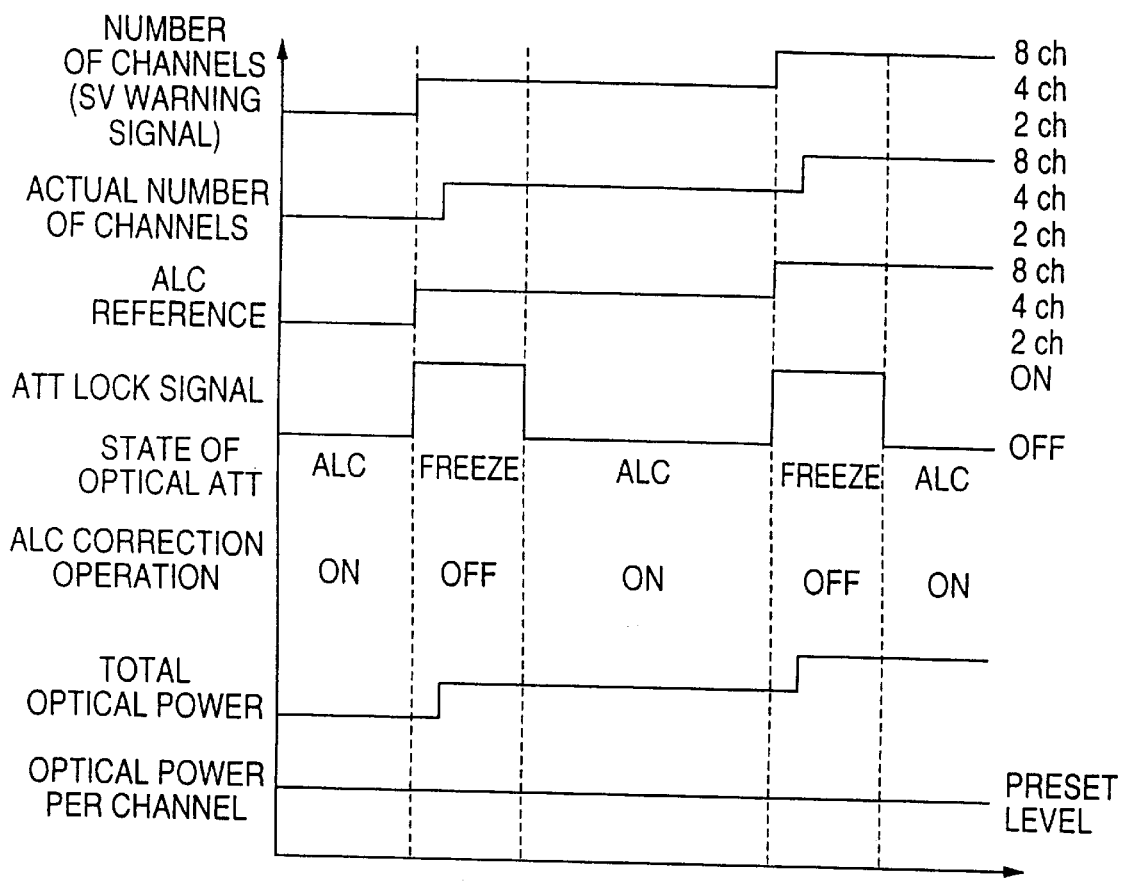
FIG. 28 is a timing diagram illustrating the operation of an optical amplifying apparatus, according to an embodiment of the present invention.

FIG. 28 is a timing diagram illustrating the above-described operation flow.

Therefore, in the processing of the variation in the number of channels, a wavelength-multiplexed optical fiber amplifier is temporarily stopped from performing an automatic level control function and, instead, is made to perform a constant gain control function, or to cause the optical amplifying apparatus, as a whole, to perform a constant gain function.

However, in an optical communication system, it is usually necessary to maintain the power of an optical signal supplied to a light receiving element at a constant level. Although a variation in the input power due to polarization variation occurs under conventional circumstances, the control for maintaining the optical gain of the optical fiber amplifier at a constant level causes the power of the optical signal supplied to the light receiving element to vary.

This problem can be overcome by demultiplexing the optical signal into individual channels, and controlling the power level of the individual demultiplexed channels.

Figure 29:
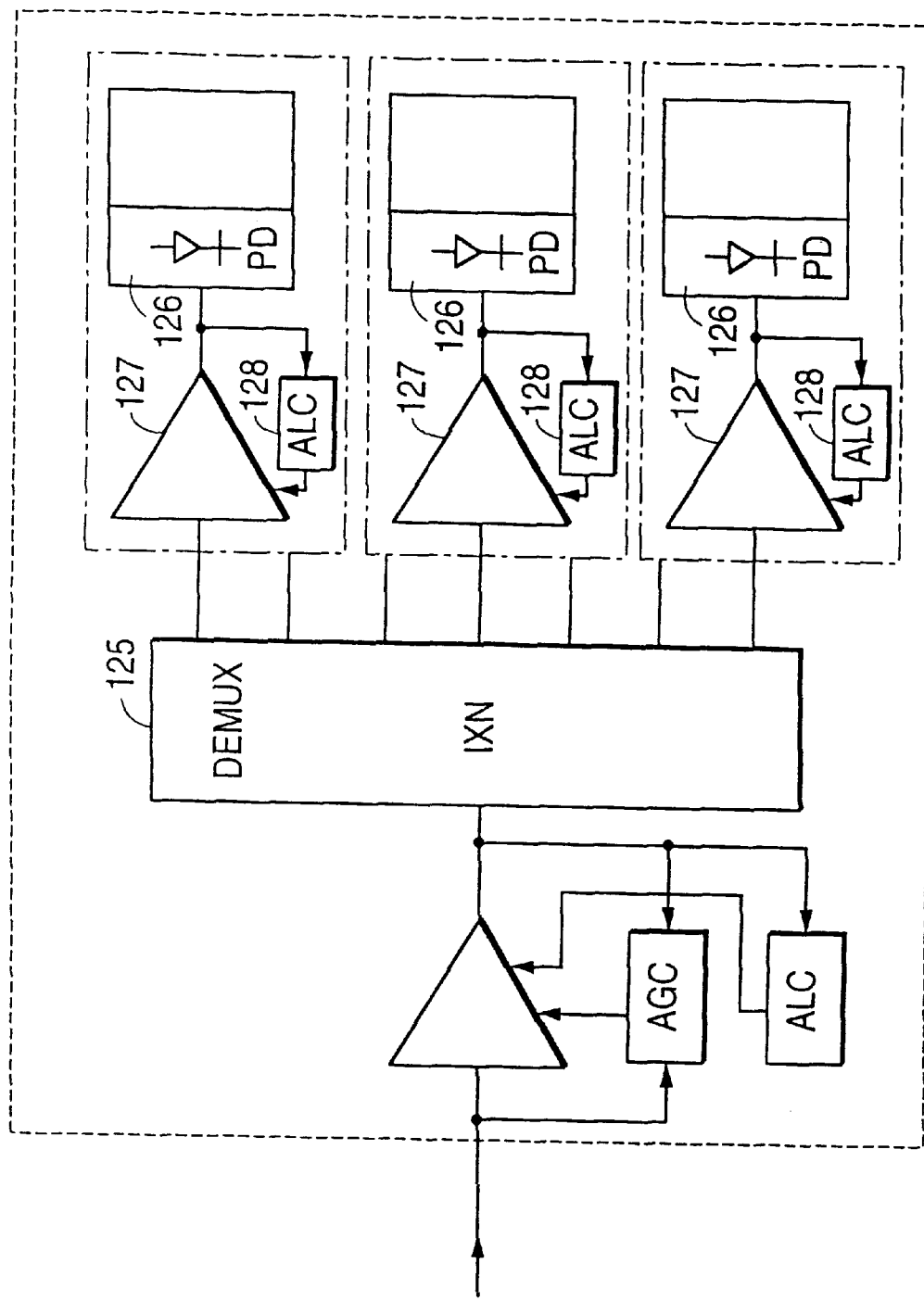
FIG. 29 is a diagram illustrating a portion of an optical communication system, according to an embodiment of the present invention.

More specifically, FIG. 29 is a diagram illustrating a portion of an optical communication system, according to an embodiment of the present invention. Referring now to FIG. 29, a demultiplexer (DEMUX) 125 demultiplexes a wavelength-multiplexed optical signal into individual channels to be received by individual receivers 126. An optical preamplifier 127 and an automatic level control unit 128 is provided for each channel, so that the associated receiver 126 receives an optical signal at a constant power level.

According to the above embodiments of the present invention, an optical attenuator or an optical amplifier can be controlled to provide a constant gain while the number of channels in a wavelength-multiplexed optical signal are being varied. In this case, the gain G can be in the range ($0 \leq G \leq 1$). Thus, an optical attenuator can be controlled to provide a constant gain by maintaining a constant ratio between the input and the output of the optical attenuator.

According to the above embodiments of the present invention, a rare-earth doped optical fiber used in an optical amplifier, where the dopant is erbium (Er). However, the present invention is not intended to be limited to an erbium (Er) doped optical fiber. Instead, other rare-earth-doped optical fibers, such as a neodymium(Nd)-doped optical fiber or a praseodymium(Pd)-doped optical fiber, may also be used, depending on the wavelength involved. Further, for example, the various photodiodes disclosed herein can be replaced by phototransistors.

According to the above embodiments of the present invention, specific embodiments of automatic gain control circuits and automatic level control circuits are disclosed. However, the present invention is not intended to be limited to any specific circuit configuration for these circuits, or for other circuits disclosed herein. Instead, many different circuit configuration can be used.

Moreover, according to the above embodiments of the present invention, an optical attenuation is used to provide a variable attenuation. There are many different types of known optical attenuators, and the embodiments of the present invention are not intended to be limited to any specific type of optical attenuator.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical communication system comprising:

a terminal station which sends first and second light signals through an optical transmission line, the first light signal having a variable number of channels associated with different wavelengths, and the second light signal indicating initiation of changing the number of channels in the first light signal; and an optical repeater which receives the first and second light signals, the optical repeater including
an optical amplifier which amplifies the first light signal, and
a controller which receives the second light signal and, upon receipt of the second light signal, controls the optical amplifier to amplify the first light signal with an approximately constant gain during a process of changing the number of channels.

2. An optical communication system according to claim 1, wherein the optical repeater further includes an optical attenuator, with a variable light transmissivity, for passing the first light signal, and the optical repeater has a first mode in which the optical amplifier is controlled to amplify the first light signal with an approximately constant gain while the number of channels is being varied, and a second mode in which a power level of the first light signal amplified by the optical amplifier is controlled by varying the light transmissivity of the optical attenuator.

3. An optical communication system according to claim 2, wherein, in the second mode, the optical repeater maintains a power level of the first light signal amplified by the optical amplifier at an approximately constant level in accordance with the number of channels in the first light signal.

4. An optical communication system according to claim 1, wherein the terminal station sends the second light signal through a supervisory channel having a wavelength different from the first light signal.

5. An optical communication system for transmitting, through an optical transmission line, a first light signal having a variable number of channels associated with different wavelengths, comprising:

a terminal station which sends, through the optical transmission line, a second light signal indicating initiation of changing the number of channels in the first light signal; and an optical repeater which receives the first and second light signals, the optical repeater including
an optical amplifier which amplifies the first light signal, and
a controller which receives the second light signal and, upon receipt of the second light signal, controls the optical amplifier to amplify the first light signal with an approximately constant gain during a process of changing the number of channels and produces the third light signal indicating that the process is ready to be completed, the optical repeater transmitting the first and third light signals.

6. An optical communication system according to claim 5, wherein the terminal station sends the second light signal through a supervisory channel having a wavelength different from the first light signal, and the optical repeater sends the third light signal through the supervisory channel.

7. An optical communication system comprising:
- a terminal station which sends first and second light signals through an optical transmission line, the first light signal having a variable number of channels associated with different wavelengths, and the second light signal indicating completion of changing the number of channels in the first light signal; and
- an optical repeater which receives the first and second light signals, the optical repeater including
  - an optical amplifier which amplifies the first light signal, and
  - a controller which receives the second light signal and, upon receipt of the second light signal, completes a first mode in which the optical amplifier is controlled to amplify the first light signal with an approximately constant gain during a process of changing the number of channels.

8. An optical communication system according to claim 7, wherein
- the optical repeater further includes an optical attenuator, with a variable light transmissivity, for passing the first light signal, and
- the controller has a second mode in which a power level of the first light signal amplified by the optical amplifier is controlled by varying the light transmissivity of the optical attenuator.

9. An optical communication system according to claim 8, wherein, in the second mode, the optical repeater maintains a power level of the first light signal amplified by the optical amplifier at an approximately constant level in accordance with the number of channels in the first light signal.

10. An optical communication system according to claim 7, wherein the terminal station sends the second light signal through a supervisory channel having a wavelength different from the first light signal.

11. An optical communication system comprising:
- a terminal station which sends first and second light signals through an optical transmission line, the first light signal having a variable number of channels associated with different wavelengths, and the second light signal indicating initiation of changing the number of channels in the first light signal; and
- an optical repeater which receives the first and second light signals, the optical repeater including
  - a controller which receives the second light signal and, upon receipt of the second light signal, starts preparation of changing the number of channels, and
  - an optical amplifier which is controlled by the controller to amplify the first light signal with an approximately constant gain during the preparation of changing the number of channels.

12. An optical communication system according to claim 11, wherein
- the optical repeater further includes an optical attenuator, with a variable light transmissivity, for passing the first light signal, and
- the optical repeater has a first mode in which the optical amplifier is controlled to amplify the first light signal with an approximately constant gain during the preparation of changing the number of channels, and a second mode in which a power level of the first light signal amplified by the optical amplifier is controlled by varying the light transmissivity of the optical attenuator.

13. An optical communication system according to claim 12, wherein, in the second mode, the optical repeater maintains a power level of the first light signal amplified by the optical amplifier at an approximately constant level in accordance with the number of channels in the first light signal.

14. An optical communication system according to claim 11, wherein the terminal station sends the second light signal through a supervisory channel having a wavelength different from the first light signal.

15. An optical communication system for transmitting, through an optical transmission line, a first light signal having a variable number of channels associated with different wavelengths, comprising:
- a terminal station which sends, through the optical transmission line, a second light signal indicating initiation of changing the number of channels in the first light signal; and
- an optical repeater which receives the first and second light signals, the optical repeater including
  - a controller which receives the second light signal and, upon receipt of the second light signal, starts preparation of changing the number of channels and produces a third light signal indicating that the preparation is ready to be completed, and
  - an optical amplifier which is controlled by the controller to amplify the first light signal with an approximately constant gain during the preparation of changing the number of channels, the optical repeater transmitting the first and third light signals.

16. An optical communication system according to claim 15, wherein the terminal station sends the second light signal through a supervisory channel having a wavelength different from the first light signal and the optical repeater sends the third light signal through the supervisory channel.

17. An optical communication system comprising:
- a terminal station which sends first and second light signals through an optical transmission line, the first light signal having a variable number of channels associated with different wavelengths, and the second light signal indicating completion of changing the number of channels in the first light signal; and
- an optical repeater which receives the first and second light signals, the optical repeater including
  - a controller which receives the second light signals and, upon receipt of the second light signal, finishes preparation of changing the number of channels, and
  - an optical amplifier which is controlled by the controller to amplify the first light signal with an approximately constant gain during the preparation of changing the number of channels.

18. An optical communication system according to claim 17, wherein
- the optical repeater further includes an optical attenuator, with a variable light transmissivity, for passing the first light signal, and
- the optical repeater has a first mode in which the optical amplifier is controlled to amplify the first light signal with an approximately constant gain during the preparation of changing the number of channels, and a second mode in which a power level of the first light signal amplified by the optical amplifier is controlled by varying the light transmissivity of the optical attenuator.

19. An optical communication system according to claim 18, wherein, in the second mode, the optical repeater maintains a power level of the first light signal amplified by the optical amplifier at an approximately constant level in accordance with the number of channels in the first light signal.

20. An optical communication system according to claim 17, wherein, the terminal station sends the second light signal through a supervisory channel having a wavelength different from the first light signal.

21. A method comprising:
- transmitting a first light signal through an optical transmission line, the first light signal having a variable number of channels associated with different wavelengths;
- transmitting a second light signal to an optical amplifier, the second light signal indicating initiation of changing the number of channels in the first light signal;
- starting preparation of changing the number of channels upon receipt of the second light signal by the optical amplifier; and
- controlling the optical amplifier to amplify the first light signal with an approximately constant gain during the preparation of changing the number of channels.

22. A method comprising:
- transmitting a first light signal through an optical transmission line, the first light signal having a variable number of channels associated with different wavelengths;
- amplifying the transmitted first light signal with an optical amplifier;
- changing the number of channels in the first light signal;
- transmitting a second light signal to the optical amplifier, the second light signal indicating completion of changing the number of channels in the first light signal;
- upon receipt of the second signal by the optical amplifier, controlling the optical amplifier to maintain a power level of the amplified first light signal at an approximately constant level in accordance with the number of channels in the first light signal.

23. An optical communication network, comprising:
- an optical transmission line;
- terminal stations, each connected to the optical transmission line, for transmitting and receiving, through the optical transmission line, a first light signal having a variable number of channels associated with different wavelengths and a second light signal indicating initiation of changing the number of channels in the first light signal;
- an optical repeater which receives the first and second light signals through the optical transmission line, the optical repeater including
  - a controller which receives the second light signal and, upon receipt of the second light signal, starts preparation of changing the number of channels, and
  - an optical amplifier which is controlled by the controller to amplify the first light signal with an approximately constant gain during the preparation of changing the number of channels.

24. An optical communication network according to claim 23, wherein
- the optical repeater further includes an optical attenuator, with a variable light transmissivity, for passing the first light signal, and,
- the optical repeater has a first mode in which the optical amplifier is controlled to amplify the first light signal with an approximately constant gain during the preparation of changing the number of channels, and a second mode in which a power level of the first light signal amplified by the optical amplifier is controlled by varying the light transmissivity of the optical attenuator.

25. An optical communication network according to claim 24, wherein, in the second mode, the optical repeater maintains a power level of the first light signal amplified by the optical amplifier at an approximately constant level in accordance with the number of channels in the first light signal.

26. An optical communication system network according to claim 23, wherein a respective terminal station send the second light signal through a supervisory channel having a wavelength different from the first light signal.

27. An optical communication network, comprising:
- an optical transmission line;
- terminal stations, each connected to the optical transmission line, for transmitting and receiving, through an optical transmission line, a first light signal having a variable number of channels associated with different wavelengths and a second light signal indicating completion of changing the number of channels; and
- an optical repeater receiving the first and second light signals, the optical repeater including
  - a controller which receives the second light signal and, upon receipt of the second light signal, finishes preparation of changing the number of channels, and
  - an optical amplifier which is controlled by the controller to amplify the first light signal with an approximately constant gain during the preparation of changing the number of channels.

28. An optical communication network according to claim 22, wherein
- the optical repeater further includes an optical attenuator, with a variable light transmissivity, for passing the first light signal, and
- the optical repeater has a first mode in which the optical amplifier is controlled to amplify the first light signal with an approximately constant gain during the preparation of changing the number of channels, and a second mode in which a power level of the first light signal amplified by the optical amplifier is controlled by varying the light transmissivity of the optical attenuator.

29. An optical communication system according to claim 28, wherein, in the second mode, the optical repeater maintains a power level of the first light signal amplified by the optical amplifier at an approximately constant level in accordance with the number of channels in the first light signal.

30. An optical communication system according to claim 27, wherein the terminal stations send the second light signal through a supervisory channel having a wavelength different from the first light signal.

* * * * *

UNITED STATES PATENT AND TRADEMARK OFFICE
CERTIFICATE OF CORRECTION

PATENT NO.:   5,966,237
DATED      :   October 12, 1999
INVENTOR(S):   Yasushi SUGAYA et al.

It is certified that error appears in the above-identified patent and that said Letters Patent is hereby corrected as shown below:

On the title page, first column, [56] References Cited, add the following U.S. reference:

--5,805,322   9/1998      Tomofuji      359/177--.

Signed and Sealed this

Eighteenth Day of April, 2000

Attest:

Q. TODD DICKINSON

Attesting Officer                 Director of Patents and Trademarks